United States Patent
Wallis et al.

(10) Patent No.: US 12,491,182 B2
(45) Date of Patent: Dec. 9, 2025

(54) POLYMORPHS OF TRIAZOLE ANTIFUNGAL COMPOUND PC945

(71) Applicant: Pulmocide Limited, London (GB)

(72) Inventors: Christopher John Wallis, London (GB); Gerald Steele, Loughborough (GB); Suzanne Buttar, Cambridge (GB); Osama Suleiman, Cambridge (GB); Julian Northen, Sunderland (GB); John Mykytiuk, Sunderland (GB); Jamie Marshall, Sunderland (GB)

(73) Assignee: PULMOCIDE LIMITED, London (GB)

( * ) Notice: Subject to any disclaimer, the term of this patent is extended or adjusted under 35 U.S.C. 154(b) by 776 days.

(21) Appl. No.: 17/782,232

(22) PCT Filed: Dec. 4, 2020

(86) PCT No.: PCT/GB2020/053107
§ 371 (c)(1),
(2) Date: Jun. 3, 2022

(87) PCT Pub. No.: WO2021/111142
PCT Pub. Date: Jun. 10, 2021

(65) Prior Publication Data
US 2023/0028714 A1    Jan. 26, 2023

(30) Foreign Application Priority Data
Dec. 6, 2019 (GB) .................................. 1917867

(51) Int. Cl.
*A61K 31/496* (2006.01)
*A61K 31/7048* (2006.01)
*C07D 405/06* (2006.01)

(52) U.S. Cl.
CPC ........ *A61K 31/496* (2013.01); *A61K 31/7048* (2013.01); *C07D 405/06* (2013.01)

(58) Field of Classification Search
CPC .. A61K 31/496; A61K 31/7048; A61K 47/02; A61K 47/10; A61P 31/10; C07D 405/06; C07B 2200/13
See application file for complete search history.

(56) References Cited

U.S. PATENT DOCUMENTS

| | | | |
|---|---|---|---|
| 5,039,676 | A | 8/1991 | Saksena et al. |
| 5,486,625 | A | 1/1996 | Leong et al. |
| 5,714,490 | A | 2/1998 | Saksena et al. |
| 10,093,659 | B2 | 10/2018 | Sunose et al. |
| 10,106,531 | B2 | 10/2018 | Colley et al. |
| 10,344,022 | B2 | 7/2019 | Colley et al. |
| 10,450,304 | B2 | 10/2019 | Colley et al. |
| 10,487,073 | B2 | 11/2019 | Sunose et al. |
| 10,662,179 | B2 | 5/2020 | Colley et al. |
| 10,800,762 | B2 | 10/2020 | Sunose et al. |
| 10,858,345 | B2 | 12/2020 | Colley et al. |
| 11,008,307 | B2 | 5/2021 | Sunose et al. |
| 11,661,415 | B2 | 5/2023 | Colley et al. |
| 2011/0065722 | A1 | 3/2011 | Wieser et al. |
| 2021/0238169 | A1 | 8/2021 | Sunose et al. |
| 2023/0295133 | A1 | 9/2023 | Colley et al. |

FOREIGN PATENT DOCUMENTS

| | | |
|---|---|---|
| EP | 0 228 125 B1 | 3/1992 |
| EP | 0 957 101 A1 | 11/1999 |
| WO | WO 89/04829 A1 | 6/1989 |
| WO | WO 95/17407 A1 | 6/1995 |
| WO | WO 96/38443 A1 | 12/1996 |
| WO | WO 02/080678 A1 | 10/2002 |
| WO | WO 2013/036866 A1 | 3/2013 |
| WO | WO 2016/087878 A1 | 6/2016 |
| WO | WO 2016/087880 A1 | 6/2018 |

OTHER PUBLICATIONS

Bowyer et al., "Environmental fungicides and triazole resistance in Aspergillus", Pest Manag Sci, 2014, vol. 70, pp. 173-178.
Castelli et al., "Novel antifungal agents: a patent review (2011-present)", Expert Opin. Ther. Patents, 2014, vol. 24, No. 3, pp. 323-338.
Colley et al., "In Vitro and In Vivo Antifungal Profile of a Novel and Long-Acting Inhaled Azole, PC945, on Aspergillus fumigatus Infection", Antimicrobial Agents and Chemotherapy, May 2017, vol. 61, Issue 5, e02280-16, pp. 1-14.
Hepperle et al., "Mono N-arylation of piperazine(III): metal-catalyzed N-arylation and its application to the novel preparations of the antifungal posaconazole and its advanced intermediate", Tetrahedron Letters, 2002, vol. 43, pp. 3359-3363.
International Search Report, issued in PCT/GB2020/053107, dated Feb. 12, 2021.
Kimura et al., "In Vivo Biomarker Analysis of the Effects of Intranasally Dosed PC945, a Novel Antifungal Triazole, on Aspergillus fumigatus Infection in Immunocompromised Mice", Antimicrobial Agents and Chemotherapy, Sep. 2017, vol. 61, Issue 9, e00124-17, pp. 1-13.

(Continued)

*Primary Examiner* — Umamaheswari Ramachandran
(74) *Attorney, Agent, or Firm* — Birch, Stewart, Kolasch & Birch, LLP

(57) ABSTRACT

The invention relates to crystalline polymorphic manifestations of a compound of formula (I) and related aspects.

(I)

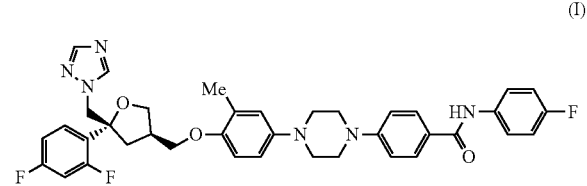

5 Claims, 11 Drawing Sheets

(56) References Cited

OTHER PUBLICATIONS

Saksena et al., "Stereoselective Grignard additions to N-formyl hydrazone: a concise synthesis of Noxafil$^R$ side chain and a synthesis of Noxafil$^R$", Tetrahedron Letters, 2004, vol. 45, pp. 8249-8251.
Written Opinion of the International Searching Authority, issued in PCT/GB2020/053107, dated Feb. 12, 2021.
"64 General testing method," Japanese Pharmacopoeia, 16th Edition, 2011, pp. 64-68, 17 pages total.
"Dispensing pharmacy (Principle and application)," Nanzando Co., Ltd., Sep. 20, 1977, pp. 142-145, 6 pages total.
"New pharmacy." Nanzando Co., Ltd., Apr. 25, 1984, pp. 102-103, 6 pages total.
"New reviews of practical pharmacy," Nankoudo Co., Ltd., Apr. 10, 1987, p. 111, 2 pages total.
"Points for Screening, Evaluation, and Control in Crystal Polymorphism," Pharm Stage, vol. 6, 2007, pp. 48-53, 10 pages total.
Ashizawa, "Polymorphism and crystallization of the pharmaceutical drugs," Maruzen Planet Co. Ltd., Sep. 20, 2002, pp. 3-16, 20 pages total.
Brittain, "Polymorphism in Pharmaceutical Solids," Drugs and the Pharmaceutical Sciences, vol. 192, 2009, 210 pages total.
Seiichiro, "Experimental chemical lecture, second series, 2. Separation and purification," Maruzen Co., Ltd., Jan. 25, 1967, pp. 159-178, 26 pages total.
Takata, "API form screening and selection in drug discovery stage," Pharm Stage, vol. 6, No. 10, Jan. 15, 2007, pp. 20-25, 10 pages total.
Yamano, "Approach to Crystal Polymorph in Process Research of New Drug," Journal of the Society of Synthetic Organic Chemistry, vol. 65, 2007, pp. 907-913, 14 pages total.

POLYMORPHS OF TRIAZOLE ANTIFUNGAL COMPOUND PC945

FIELD OF INVENTION

The invention relates to crystalline polymorphic manifestations of a compound useful in the treatment of mycoses and to compositions and uses thereof.

BACKGROUND

The incidence of fungal infections has increased substantially over the past two decades and invasive forms are leading causes of morbidity and mortality, especially amongst immunocompromised or immunosuppressed patients. Disseminated candidiasis, pulmonary aspergillosis, and emerging opportunistic fungi are the most common agents producing these serious mycoses. It is a particular feature of fungi that they are able to generate an extracellular matrix (ECM) that binds them together and allows them to adhere to their in vitro or in vivo substrates. These biofilms serve to protect them against the hostile environments of the host's immune system and to resist the activity of antifungal agents (Kaur and Singh, 2013).

Pulmonary aspergillosis can be segmented into either a non-invasive or an invasive condition. A further sub-division is used to characterise the condition in patients who exhibit symptoms having an allergic component to aspergillosis (known as ABPA; allergic bronchopulmonary aspergillosis) compared with those who do not. The factors precipitating pulmonary aspergillosis may be acute, such as exposure to high doses of immuno-suppressive medicines or to intubation in an intensive care unit. Alternatively, they may be chronic, resulting from a previous infection, such as with TB (Denning et al., 2011a). Chronic lung infections with *aspergillus* can leave patients with extensive and permanent lung damage, requiring lifetime treatment with oral azole drugs (Limper et al., 2011).

A growing body of research suggests that *aspergillus* infection may play an important role in clinical asthma (Chishimba et al., 2012; Pasqualotto et al., 2009). Furthermore, recently published work has correlated *aspergillus* infection with poorer clinical outcomes in patients with COPD (Bafadhel et al., 2013). Similarly, cross-sectional studies have shown associations between the presence of *Aspergillus* spp. and *Candida* spp. in the sputum of patients and their worsened lung function (Chotirmall et al., 2010; Agbetile et al., 2012).

Invasive aspergillosis (IA) results in high mortality rates amongst immunocompromised patients, for example, those undergoing allogenic stem cell transplantation or solid organ transplants (such as lung transplants). The first case of IA reported in an immunocompromised patient occurred in 1953. This event was concurrent with the introduction of corticosteroids and cytotoxic chemotherapy into treatment regimens (Rankin, 1953). Invasive aspergillosis is a major concern in the treatment of leukaemia and other haematological malignancies given its high incidence and associated mortality. Death rates usually exceed 50% (Lin et al., 2001) and long term rates can reach 90% in allogeneic hematopoietic stem cell transplantation recipients, despite the availiability of oral triazole medicines (Salmeron et al., 2012). In patients undergoing solid organ transplantation, particularly of the lung, the use of high doses of steroids leaves patients vulnerable to infection (Thompson and Patterson, 2008). The disease has also appeared in less severely immunocompromised patient populations. These include those suffering with underlying COPD or cirrhosis, patients receiving high dose steroids, and individuals fitted with central venous catheters or supported by mechanical ventilation (Dimopoulos et al., 2012).

Existing anti-fungal medicines are predominantly dosed either orally or systemically. These commonly exploited routes of delivery are poor for treating lung airways infections, since drug concentrations, achieved at the site of infection, tend to be lower than those in non-affected organs. This is especially so for the liver, which is the principal site of toxicity in up to 15% of patients treated with voriconazole and who suffer raised transaminase levels (Levin et al., 2007; Lat and Thompson, 2011). Exposure of the liver also results in significant drug interactions arising from the the inhibition of hepatic P450 enzymes (Jeong et al., 2009; Wexler et al., 2004).

Furthermore, the widespread use of triazoles, both in the clinic and in agriculture, has led to a growing and problematic emergence of resistant mycoses in some locations (Denning et al., 2011b; Bowyer and Denning, 2014).

Compounds which have utility in the treatment of mycoses are described in WO2016/087878 A1 (Sunose et al., 2016) and WO2016/087880 A1 (Colley et al., 2016). Compound I is disclosed in the abovementioned patent application publications and is 4-(4-(4-(((3R,5R)-5-((1H-1,2,4-triazol-1-yl)methyl)-5-(2,4-difluorophenyl) tetrahydrofuran-3-yl)methoxy)-3-methylphenyl)piperazin-1-yl)-N-(4-fluorophenyl)benzamide:

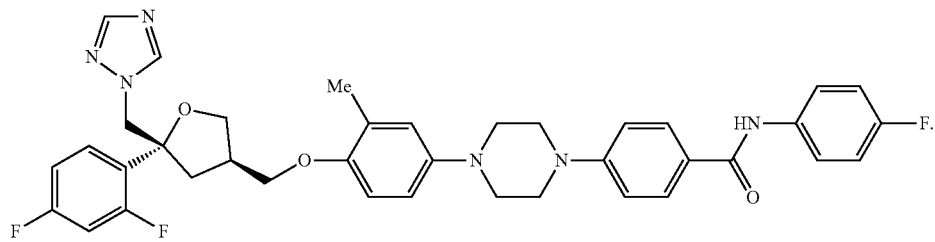

Compound I

Compound I is a potent inhibitor of *Aspergillus fumigatus* sterol 14α-demethylase (CYP51A and CYP51B) and has been characterised as a potent, long acting anti-fungal agent in vitro and in vivo (Colley et al., 2017). Furthermore, it has been disclosed that topical treatment with Compound I, in combination with a known, systemic triazole agent, demonstrated synergistic anti-fungal effects against *Aspergillus fumigatus* in an in vitro human alveolus bilayer model and in the lungs of neutropenic, immunocompromised mice (Colley et al., 2019). Compound I was also found to be a more potent inhibitor than posaconazole, voriconazole and fluconazole of *Candida auris* isolates collected globally (Shivaprakash et al., 2019). The analysis of biomarkers, following intranasal dosing of Compound I in immunocompromised mice, showed that the anti-fungal effects accumulated upon repeat dosing and were persistent (Kimura et al., 2017).

Polymorphism is an important consideration in the development of a medicinal product because of its influence on the physicochemical and biopharmaceutical properties of the compound. This characteristic arises whenever an entity, such as small molecule, can adopt different crystalline lattices. The resulting variation in solid state packing can lead to differences in storage stability, solubility profiles and density thereby affecting formulation and product manufacturing, as well as dissolution characteristics: an important factor in determining bioavailability in vivo.

There remains a need to provide polymorphic forms of Compound I for use in the treatment of mycoses. In particular, there is a requirement to provide Compound I in a crystalline form which has appropriate physical and chemical stability and other drug-related properties pertinent to its topical administration to the lung. These include its susceptibility to micronisation, its formulation as a readily dispersible, aqueous suspension, in addition to adequate bioavailability and acceptable pharmacokinetic properties.

SUMMARY OF THE INVENTION

The invention provides a compound of formula (I):

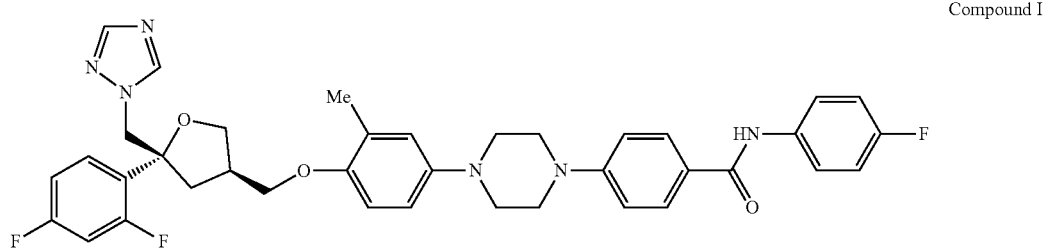 [SMILES: Cc1cc(N2CCN(c3ccc(C(=O)Nc4ccc(F)cc4)cc3)CC2)ccc1OC[C@@H]1CO[C@@](Cn2cncn2)(c2ccc(F)cc2F)C1]

Compound I that is 4-(4-(4-(((3R,5R)-5-((1H-1,2,4-triazol-1-yl)methyl)-5-(2,4-difluorophenyl)tetrahydrofuran-3-yl)methoxy)-3-methylphenyl) piperazin-1-yl)-N-(4-fluorophenyl)benzamide in a crystalline form wherein the crystalline form is polymorphic Form 1.

In addition, the invention provides a compound of formula (I):

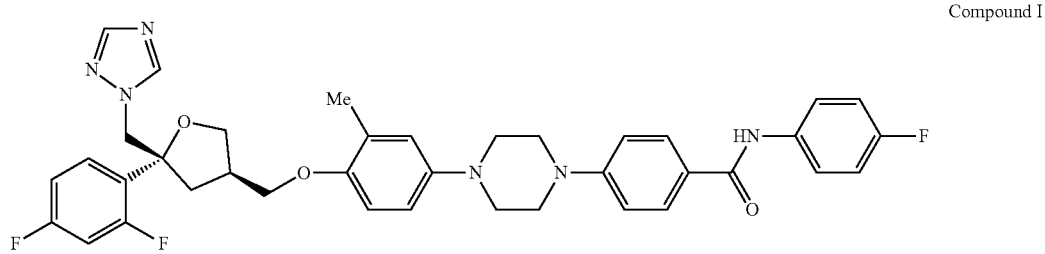 [SMILES: Cc1cc(N2CCN(c3ccc(C(=O)Nc4ccc(F)cc4)cc3)CC2)ccc1OC[C@@H]1CO[C@@](Cn2cncn2)(c2ccc(F)cc2F)C1]

Compound I that is 4-(4-(4-(((3R,5R)-5-((1H-1,2,4-triazol-1-yl)methyl)-5-(2,4-difluorophenyl)tetrahydrofuran-3-yl)methoxy)-3-methylphenyl) piperazin-1-yl)-N-(4-fluorophenyl)benzamide in a crystalline form wherein the crystalline form is polymorphic Form 2.

The skilled person will appreciate that although a specific tautomer is shown above, the compound may exist in multiple tautomeric forms. The invention encompasses all such tautomeric forms.

The compound of formula (I) is herein referred to as Compound I.

As described in the Examples, the crystalline polymorphic Form 1 and the crystalline polymorphic Form 2 possess distinctly different crystal structures. In particular, polymorphic Forms 1 and 2 of the invention have the following characteristics and properties which make them particularly suitable for use as therapeutic agents. The polymorphs display high melting points [~202° C. (Form 1) and ~183° C. (Form 2)]; are physically robust (as determined by XRPD, TGA and DSC analysis); have good chemical stabilities (as determined by $^1$H NMR spectroscopy and HPLC analysis); are readily micronised to a respirable particle size; and are bioavailable when administered as an aqueous suspension by inhalation. Therefore, the Form 1 polymorph and the Form 2 polymorph are expected to be useful in various therapeutic applications as described herein.

DETAILED DESCRIPTION OF THE INVENTION

Figure 1:
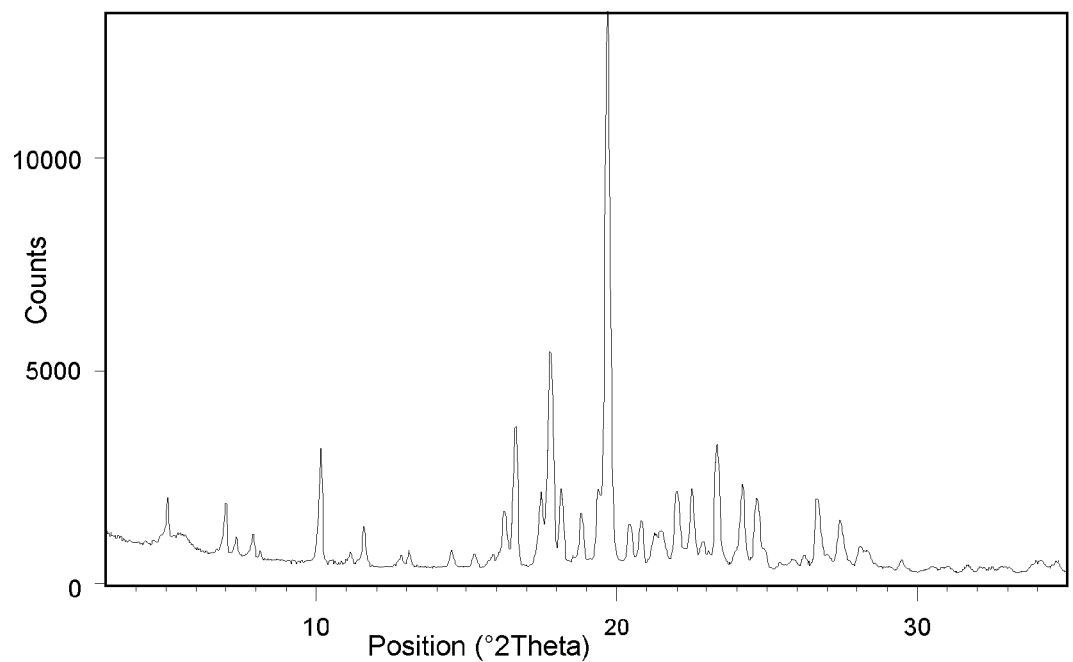
FIG. 1: High resolution XRPD pattern of a representative sample of polymorphic Form 1.
Figure 2:
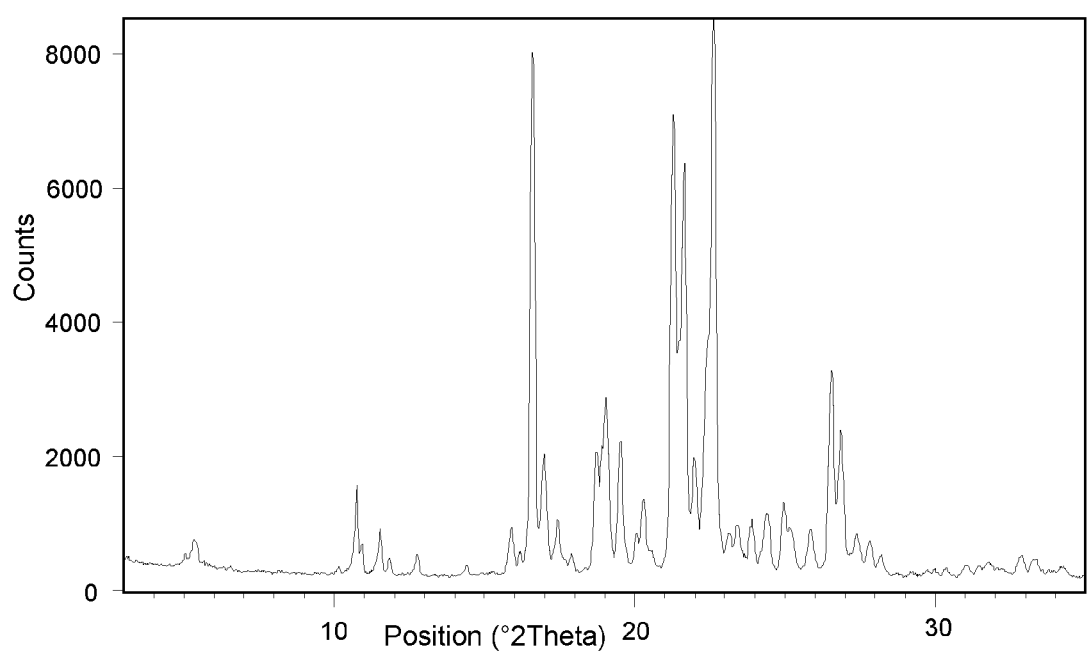
FIG. 2: High resolution XRPD pattern of a representative sample of polymorphic Form 2.
Figure 3:
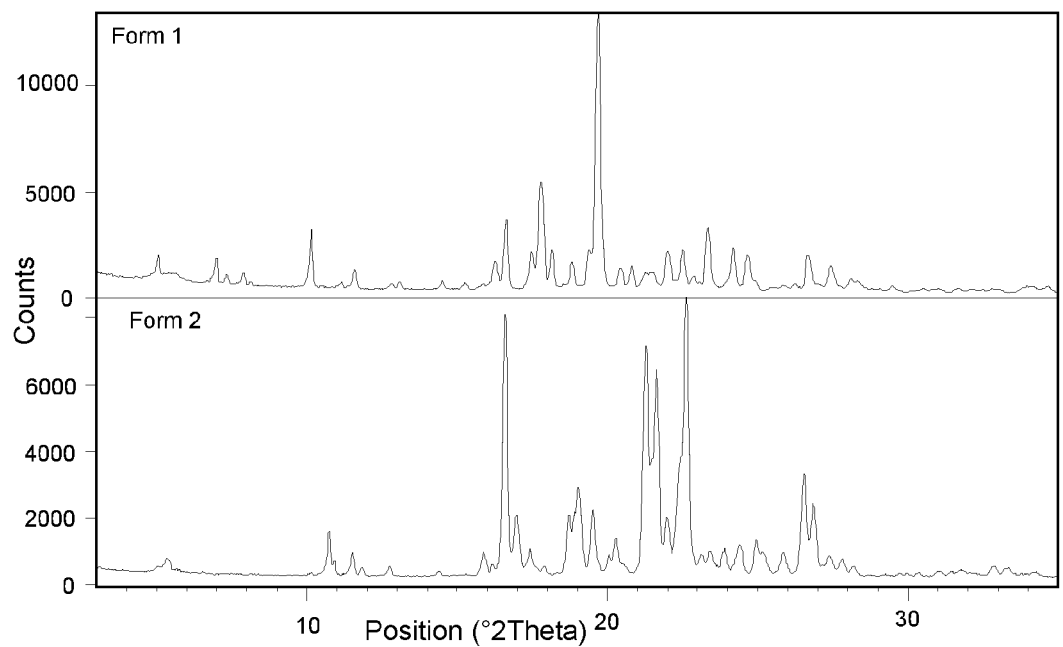
FIG. 3: Vertical alignment of high resolution XRPD patterns of polymorphic Forms 1 and 2.
Figure 4:
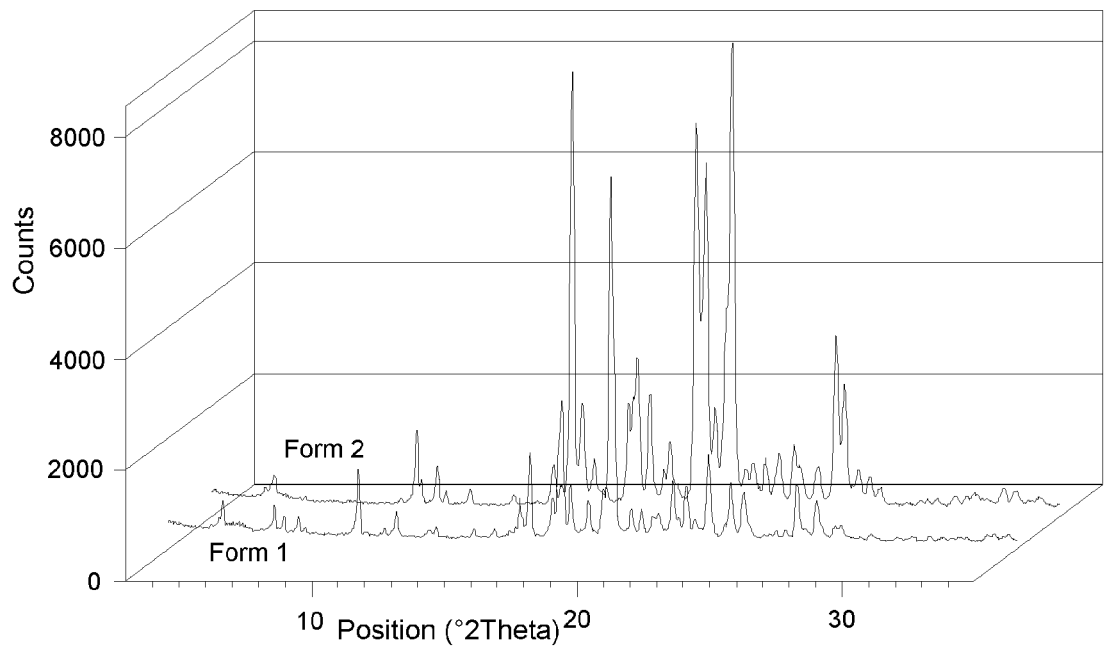
FIG. 4: Overlay of high resolution XRPD patterns of polymorphic Forms 1 and 2

An X-ray powder diffraction (XRPD) pattern consists of a plot of diffracted beam intensity versus 2θ, the diffraction angle. The 2θ peak positions of an X-ray powder diffraction pattern relate directly to the unit-cell of the crystalline phase resulting in a pattern that is unique for each polymorphic form. Consequently an XRPD pattern is characteristic to each polymorph and can be used to distinguish one polymorph from another. X-ray powder diffraction patterns were obtained directly from samples of polymorphic Forms 1 and 2, prepared as described herein (FIGS. 1 and 2). From visual comparison of the two patterns (FIGS. 3 and 4) it is clearly evident that Forms 1 and 2 of Compound I represent two distinct crystalline states.

Reflections in 2θ are considered to be unique (and therefore characteristic of the crystal form) provided that no reflection is observed within ±0.2° 2θ when two (or more) diffraction patterns are compared. Polymorphic forms 1 and 2 exhibit a number of unique reflections (Table 1).

TABLE 1

Unique XRPD Reflections of Polymorphic Forms 1 and 2.
Reflections in 2θ

| Form 1 | Form 2 |
|---|---|
| 7.0 | 10.8 |
| 7.4 | 17.0 |
| 7.9 | 20.3 |
| 18.2 | 22.7 |
| 19.7 | 23.9 |
| 20.8 | 24.3 |
| 24.7 | |

Figure 5:
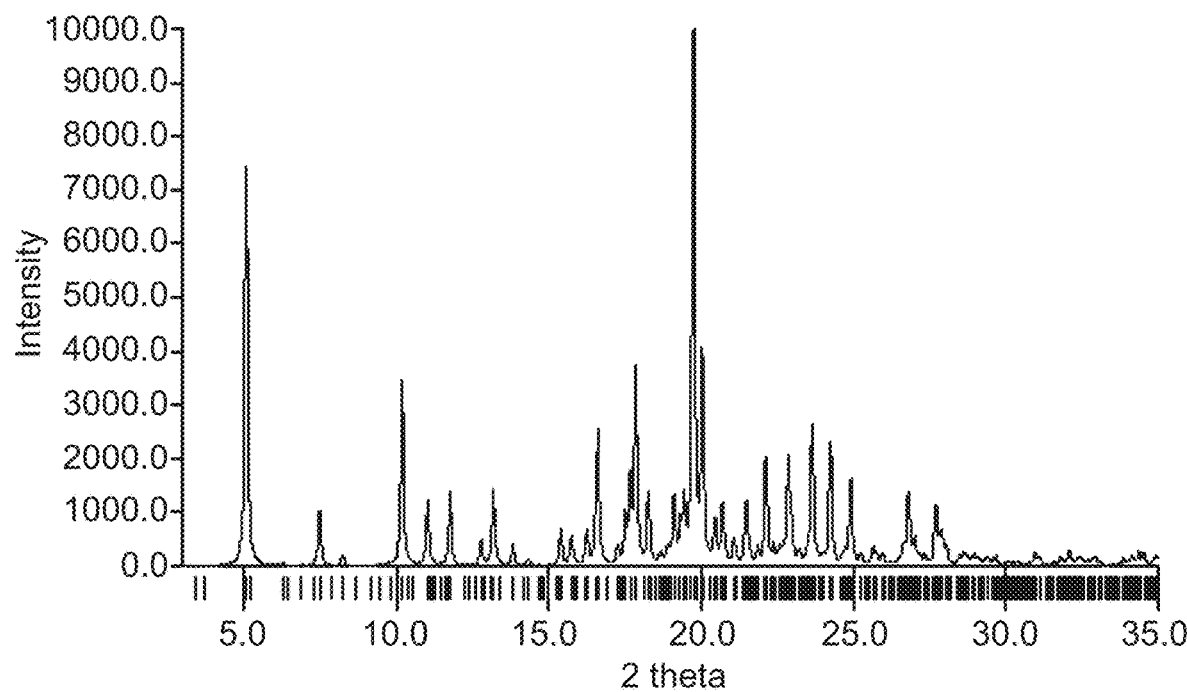
FIG. 5: Calculated XRPD pattern for polymorphic Form 1.
Figure 6:
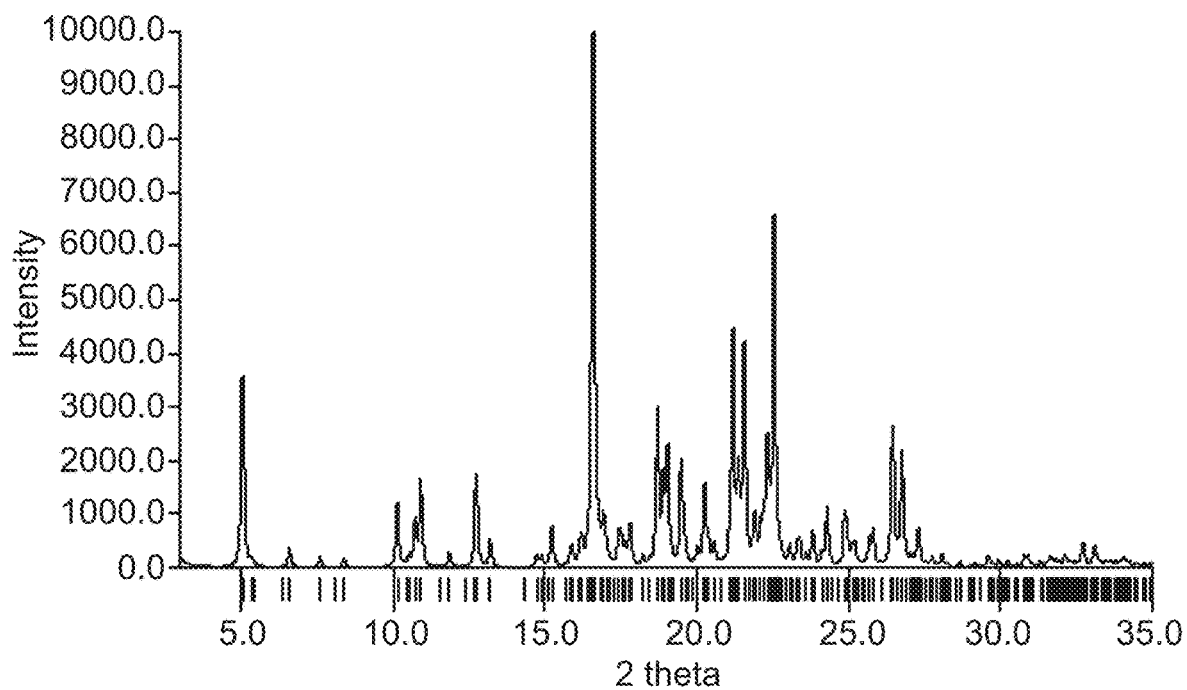
FIG. 6: Calculated XRPD pattern for polymorphic Form 2.

The elucidation of the structures of polymorphic Forms 1 and 2, using synchrotron light source X-ray crystallography, enabled the XRPD patterns of polymorphic Forms 1 and 2 to be calculated from experimental diffraction values obtained from the single crystal data set. For both polymorphs a very close correlation is observed between the experimental data (FIGS. 1 and 2) and the calculated patterns (FIGS. 5 and 6).

Thus there is provided the crystalline form of Compound I in polymorphic Form 1 having the X-ray powder diffraction pattern substantially as shown in FIG. 1.

Suitably, there is provided the crystalline form of Compound I in polymorphic Form 1 wherein the said crystalline form has an X-ray powder diffraction pattern containing three, four, five, six or seven peaks selected from (±0.2) 7.0, 7.4, 7.9, 18.2, 19.7, 20.8 and 24.7 degrees 2-theta.

Additional XRPD pattern peaks for polymorphic Form 1 are shown in Table 3. Thus, suitably there is provided the crystalline form of Compound I in polymorphic Form 1 wherein the said crystalline form has an X-ray powder diffraction pattern containing the following seven peaks: (±0.2) 7.0, 7.4, 7.9, 18.2, 19.7, 20.8 and 24.7 degrees 2-theta, and one, two, three, four or five peaks selected from (±0.2) 10.2, 16.7, 17.9, 23.3 and 24.2 degrees 2-theta.

Suitably, there is provided the crystalline form of Compound I in polymorphic Form 1 wherein the said crystalline form has unit cell dimensions of 16.80 Å, 23.58 Å and 25.58 Å, and α, β and γ angles of 90°.

Thus there is provided the crystalline form of Compound I in polymorphic Form 2 having the X-ray powder diffraction pattern substantially as shown in FIG. 2.

There is also provided the crystalline form of Compound I in polymorphic Form 2 wherein the said crystalline form has an X-ray powder diffraction pattern containing three, four, five or six peaks selected from (±0.2) 10.8, 17.0, 20.3, 22.7, 23.9 and 24.3 degrees 2-theta.

Additional XRPD pattern peaks for polymorphic Form 2 are shown in Table 3. Thus, suitably there is provided the crystalline form of Compound I in polymorphic Form 2 wherein the said crystalline form has an X-ray powder diffraction pattern containing the following six peaks: (±0.2) 10.8, 17.0, 20.3, 22.7, 23.9 and 24.3 degrees 2-theta, and one, two, three, four, five or six peaks selected from (±0.2) 16.6, 19.5, 20.3, 22.0, 26.6 and 26.9 degrees 2-theta.

Suitably, there is provided the crystalline form of Compound I in polymorphic Form 2 wherein the said crystalline form has unit cell dimensions of 16.81 Å, 5.65 Å and 35.56 Å, and an α angle of 90°, a β angle of 101.54° and a γ angle of 90°.

Form 3 (Prior Art) Polymorph

Compound I is disclosed in the prior art in patent application publications WO2016/087878 A1 and WO2016/087880 A1. In these applications, Compound I, prepared as disclosed therein, was isolated by one of the methods comprising: (a) the addition of water to a reaction mixture comprising Compound I in pyridine to obtain crude, solid Compound I, followed by purification by flash column chromatography, eluting with 0-3% MeOH in DCM; (b) the addition of water to a cooled reaction mixture comprising Compound I in DMF followed by further cooling of the reaction mixture and collection by filtration to obtain solid Compound I, followed by slurrying the filter cake in water and collection of the solids by filtration or; (c) the addition of water to a reaction mixture comprising Compound I in DMSO, followed by extraction of Compound I with EtOAc, evaporation of the volatiles in vacuo and purification of the residue by flash column chromatography, eluting with 0-2% MeOH in DCM and re-purification by flash column chromatography eluting with 0-50% EtOAc in DCM.

For the purposes of the present disclosure, Compound I as previously disclosed, resulting from the synthetic routes described therein, is a poorly crystalline manifestation of Compound I referred to herein as Form 3. A common feature of these routes is that polymorphic Form 3 results from the rapid production of Compound I, either by the addition of water to a solution of Compound I in a miscible organic solvent (such as DMF or DMSO) or by evaporation of a solvent mixture following purification by chromatography. As disclosed hereinbelow, water is a powerful anti-solvent for Compound I which leads to its rapid deposition, in these instances, in a nearly amorphous state. The same principle applies to samples returned from chromatography, whereby the rapid evaporation of the eluent containing Compound I gives rise to polymorphic Form 3, rather than a more ordered crystalline form such as Form 1 or Form 2.

Without being limited by theory, experimental data teaches that precipitation of Compound I by rapid evaporation of a solution in a volatile solvent (such as DCM) leads to a disordered solid state. The same applies to the (almost instantaneous) precipitation of Compound I by anti-solvent addition; for example by quenching a solution of Compound I in a miscible organic solvent with water. Both of these processes, previously disclosed, do not allow sufficient time for the compound of formula I to attain the more thermodynamically stable, highly ordered, crystalline states exemplified by polymorphic Forms 1 and 2, disclosed herein.

A representative sample of Form 3 was prepared by the following procedure. To a suspension of 4-(4-(4-(((3R,5R)-5-((1H-1,2,4-triazol-1-yl)methyl)-5-(2,4-difluorophenyl) tetrahydrofuran-3-yl) methoxy)-3-methylphenyl)piperazin-1-yl)benzoic acid (2.50 g, 4.24 mmol), EDCI (1.63 g, 8.48 mmol) and DMAP (0.03 g, 0.21 mmol) in pyridine (30 mL) was added 4-fluoroaniline (0.41 mL, 4.32 mmol). The reaction mixture was stirred at 60° C. for 2 hr then cooled to RT, diluted with water (60 mL) and stirred for 5 min. The resulting solid was collected by filtration, washed with water (3×10 mL) and with diethyl ether (2×15 mL) to give a tan coloured powder. The crude product so obtained was purified by flash column chromatography (SiO$_2$, 40 g, 0-3% MeOH in DCM, gradient elution). The resulting yellow solid (2.37 g) was suspended in DMSO (6.50 mL) and the mixture was heated at 60° C. until dissolution was complete. The solution was cooled to RT and to the stirred solution was added water (20 mL), resulting in the precipitation of a white solid. The solid was collected by filtration, washed with water (3×10 mL) and with diethyl ether (3×5 mL), and then dried under vacuum at 50° C. for 3 days to afford Compound I as an off-white solid (2.25 g, 77%).

Figure 7:
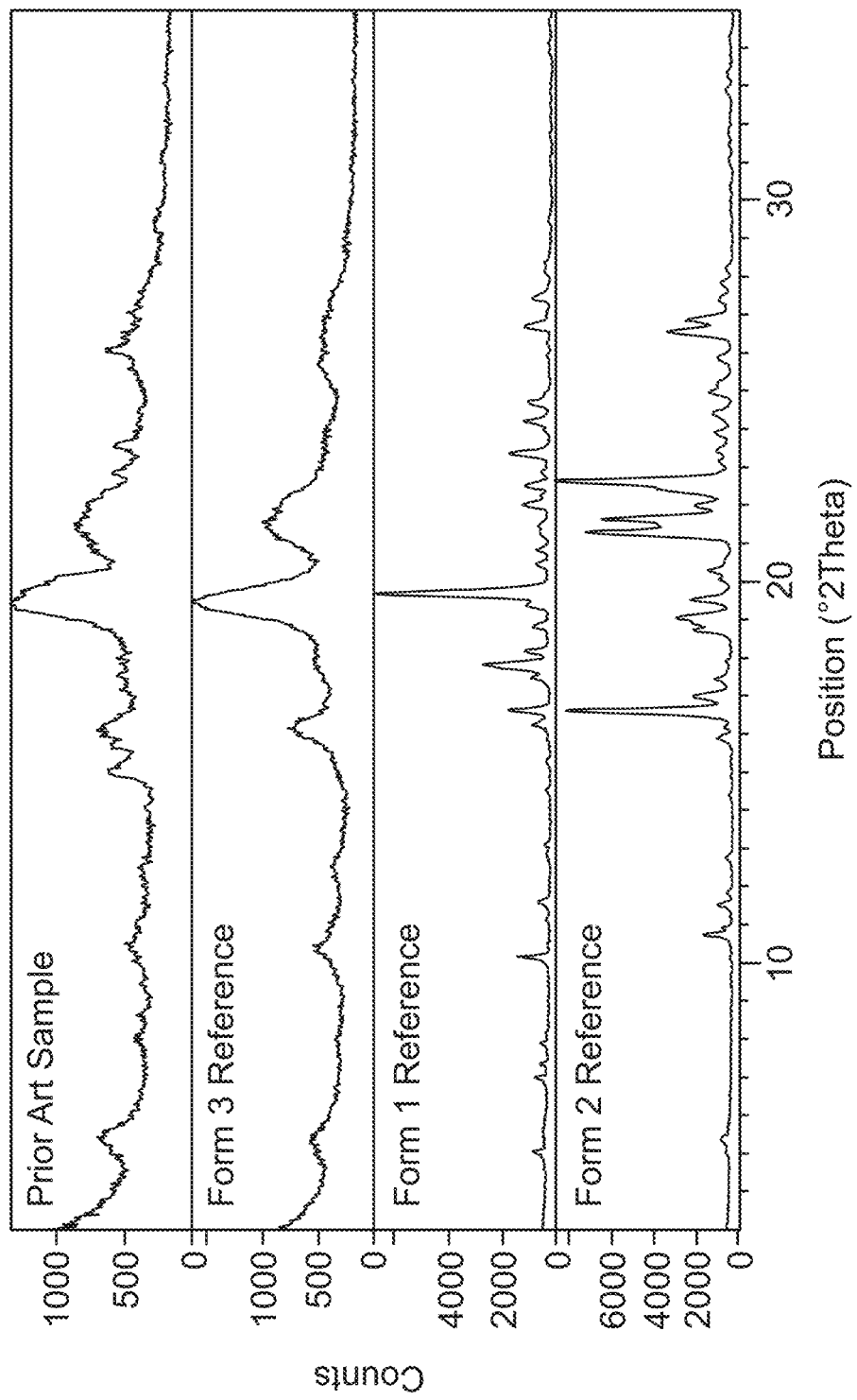
FIG. 7: XRPD pattern of a prior art sample of Form 3 compared with XRPD patterns of representative samples of Forms 1, 2 and 3.

FIG. 7 shows the XRPD pattern of Compound I as polymorphic Form 3 prepared as described above ("Prior Art Sample"), compared with a sample of Form 3 typical of the batches used in the present studies ("Form 3 Reference") and compared against XRPD patterns obtained from the Form 1 and Form 2 polymorphs. The XRPD traces of Form 3 material reveal it to be poorly crystalline and consequently it was not considered a readily developable entity. As a result, no comparative bioavailability data has been obtained for this polymorphic form (see Examples).

Properties of Polymorphic Form 1 and Form 2

Thermodynamic Stability of Polymorphic Forms 1 and 2 at Varying Temperatures It has been determined that the crystalline states, referred to herein as Form 1 and Form 2, constitute an enantiotropic polymorphic pair. This property arises from a temperature dependency of their relative thermodynamic stabilities, whereby one of the polymorphs is the most thermodynamically stable manifestation of the material up to a characteristic (empirically determined) temperature; above which their order of stability is inverted. In the present instance suspensions comprising equal amounts of the two polymorphs were matured, in one of six different solvents, at 50° C., 70° C. and 135° C. (Table 6). In all experiments conducted at both 50° C. and 70° C. the 1:1 mixtures converted into suspensions containing only the Form 2 polymorph. In contrast, all of the mixtures maintained at a temperature of 135° C. were transformed into Form 1. These data support the postulate that the thermodynamic relationship between Forms 1 and 2 is enantiotropic and that the temperature at which stability inverts (the enantiotropic transition point) is in the temperature range 70-135° C.

The predisposition of either Form 1 or Form 2 to be generated, from different conditioning environments, at temperatures below the enantiotropic transition point was investigated using cross-seeding experiments (see Tables 8 to 13 herein). In the single organic solvent systems, described in Table 8, mixtures comprising equal amounts of Form 1 and Form 2 turned over to give suspensions comprising uniquely the Form 2 polymorph. The exception was the binary mixture of IPA doped with 5% water which remained a polymorphic mixture. (Table 8, entries 10-12). It is possible to interpret this result as arising in two different ways. The first is to conclude that in aqueous IPA the solubility of Compound I, as either form, is too low for the polymorphic interconversion to take place and that kinetic factors have therefore determined the outcome. A second postulate is that the presence of water exerts an influence on the polymorphic mixture, in favour of Form 1, despite the fact that it remains the metastable polymorph in the temperature range of the experiment.

This hypothesis was investigated in a series of slurrying and cross seeding experiments (Tables 9 to 13) during which it was determined that the presence of water, at low levels, acts as a co-solvent that favours the predominance of the Form 1 polymorph. This characteristic was observed when the Form 2 polymorph was slurried in acetone and water alone and in mixtures thereof (Table 9); in THF and aqueous THF (Table 10); in dioxane/water mixtures (Table 11) and in MEK containing increasing proportions of water (Table 12).

It was evident from the data that it is the presence of water, added to these solvents, that induces the polymorphic transition. However, except at low levels, water is also a potent anti-solvent and markedly depresses the solubility of both polymorphs. The consequence of this solubility profile is that in water alone or in solvent mixtures which are rich in water, the process of turnover from Form 2 to Form 1 either does not occur or is inhibited by marginal solubility (Table 11, Entries 3, 6 and 8).

The polymorphic interconversion was observed to take place more readily on heating (Tables 9, 10 and 12) as expected from the dependence of turnover rate with temperature (as per the Arrhenius equation) and was presumably augmented by an increase in the solubility of the suspended solids. The fate of the polymorphs when equilibrated in cooled MEK or THF was found to be dependent not only upon the presence or absence of water in the system but also influenced by their initial polymorphic composition (Table 13). Mixtures of the two polymorphs converted into suspensions of Form 2 in nominally dry media, as expected, whilst the single polymorphs were unchanged. In contrast, the presence of water again favoured the Form 1 state and there was further evidence that the initial presence of this polymorph in the starting mixture (acting as seed) promoted interconversion.

The data from the slurrying and cross-seeding experiments disclosed herein reveal that the prevalence of the polymorphic Forms 1 and 2 on exposure to solvent systems is influenced by the choice of organic solvent, its water content, slurry temperature, contact time and purity (i.e. its polymorphic composition). Nevertheless, the studies described herein provide an understanding of these parameters which enable their manipulation to generate and to retain the physical integrity of either Form 1 or 2, as desired. Moreover it was determined that whilst the Form 1 crystalline state is preferred in aqueous organic media, those in which water is the principal component are essentially inert towards polymorphic interconversion.

The behaviour of these systems and the teaching which it provides is of importance in designing suitable formulations by which Compound I may be delivered to patients.

Form 1 and 2 polymorphs may readily be micronised. This means that they are suitable for use in formulations for delivery to the respiratory tract (e.g. the lung).

The studies described herein indicate surprisingly that the Form 2 polymorph, in particular, is a suitable crystalline manifestation of Compound I for formulation as an aqueous suspension despite the evidence that this form is metastable in such environments at ambient temperatures. The data obtained from the studies disclosed herein reveal that, in media comprising a high proportion of water the extremely low solubility of Compound I in water provides an effective kinetic barrier to the loss of polymorphic integrity. The physicochemical properties of Compound I (high molecular weight and lipophilicity) ensures that the two principal crystalline forms do not readily interconvert under such conditions and consequently retain their initial polymorphic composition. As demonstrated elsewhere herein, the Form 2 polymorph unexpectedly and advantageously exhibits superior bioavailability to that of the Form 1 polymorph when formulated as an aqueous suspension and administered by inhalation. Accordingly the Form 2 polymorph is a favoured presentation of Compound I for use as an inhaled therapeutic agent in nebulised aqueous suspensions.

The properties of polymorphic stability together with the lower systemic bioavailability of Form 1, when administered by inhalation, favour alternative indications and presentations for this polymorph, which are discussed below.

General Synthetic Methods

Solvates

In one aspect, there is provided Compound I in solvated form. Suitable solvates are obtained when Compound I is maturated in a number of aromatic solvents, such as anisole, acetophenone, benzyl alcohol, chlorobenzene and cumene. Alternatively, a suitable solvate is obtained when Compound I is maturated in THF. Suitably, the solvate of Compound I thus obtained contains around 13-14% by weight of solvent when analysed by TGA. Suitably, the Compound I to solvent ratio is approximately stoichiometric (1:1).

The solvates of Compound I identified were found to desolvate thermally to yield the Form 1 crystalline polymorph. The anisole solvate, for example, exhibited two sharp endotherms under DSC analysis. The first, occurring at 112-114° C., coincided with a weight reduction of 13.4% as determined from the TGA profile, corresponding to just under one equivalent of solvent and in agreement with $^{1}H$ NMR data. The second endotherm, which peaked at 202° C., corresponded to the melting point of Form 1.

Thus in one aspect, there is provided a process for preparing Compound I as the crystalline polymorphic Form 1 which comprises heating Compound I in solvated form, e.g. the solvate formed with anisole, acetophenone, benzyl alcohol, chlorobenzene or cumene, to remove the solvent and thereby produce Compound I as the crystalline polymorphic Form 1. Suitably, Compound I in solvated form is an intermediate in the synthesis of polymorphic Form 1.

Form 1 Polymorph

In one embodiment there is provided a process for the preparation of Compound I as polymorphic Form 1 comprising the step of crystallising Compound I as polymorphic Form 1 from a solution of Compound I in a solvent wherein the solvent is selected from the group consisting of toluene, 2-methoxyethanol, aqueous IPA (e.g. containing 3-6% $H_2O$ v/v, such as 5% $H_2O$ v/v) and aqueous acetone (e.g. containing 5-10% $H_2O$ v/v).

Suitably, the solvent is aqueous acetone (containing 5% $H_2O$ v/v).

Form 2 Polymorph

In one embodiment there is provided a process for the preparation of Compound I as polymorphic Form 2 comprising the step of crystallising Compound I as polymorphic Form 2 from a solution of Compound I in a nominally dry organic solvent wherein the solvent is selected from the group consisting of MIBK, THF, PrOAc, EtOH, DME, MeOH, MeCN, $MeNO_2$, n-heptane, $Et_2O$, IPA, MEK, acetone, TBME, i-BuOH, or a mixture of THF and TBME. Suitably, the process comprises the step of crystallising Compound I as polymorphic Form 2 from a solution of Compound I in a nominally dry, organic solvent mixture, wherein the solvent mixture comprises two or more solvents selected from the group consisting of MIBK, THF, PrOAc, EtOH, DME, MeOH, MeCN, $MeNO_2$, n-heptane, $Et_2O$, IPA, MEK, acetone, TBME and i-BuOH.

For the purposes of the present invention, "nominally dry" means that no water has been added to the solvent.

Depending on the hydrophilicity of the selected solvent, trace water may be present though experimental conditions are designed to exclude it.

Suitably the solvent is MIBK. Alternatively the solvent system is a mixture of THF and toluene, wherein suitably the mixture comprises between 2:1 to 1:2 THF:toluene (such as 10:5 v/v; 9:5 v/v; 8:4 v/v; 8:16 v/v THF:toluene respectively). Alternatively, the solvent system is a mixture of THF and TBME, wherein suitably the mixture comprises between 4:1 to 1:2 THF:TBME (such as 8:2 v/v; 8:2.5 v/v; 8:4 v/v; 8:6 v/v 8:8 v/v; 8:10 v/v or 8:12 v/v THF:TBME respectively).

Pharmaceutical Formulations

In an embodiment there is provided a pharmaceutical composition comprising the compound of the invention optionally in combination with one or more pharmaceutically acceptable diluents or carriers.

Suitably the compound of the invention is administered topically to the lung or nose, particularly, topically to the lung. Thus, in an embodiment there is provided a pharmaceutical composition comprising the compound of the invention optionally in combination with one or more topically acceptable diluents or carriers. Suitably the compound of the invention is administered by inhalation.

Suitably the pharmaceutically acceptable diluent or carrier is water.

The compositions may conveniently be administered in unit dosage form and may be prepared by any of the methods well-known in the pharmaceutical art, for example as described in Remington's Pharmaceutical Sciences, 17th ed., Mack Publishing Company, Easton, PA, (1985). The compositions may also conveniently be administered in multiple unit dosage form.

Suitable compositions for pulmonary or intranasal administration include powders, liquid solutions, liquid suspensions, aqueous suspensions, nasal drops comprising solutions or suspensions or pressurised or non-pressurised aerosols.

Topical administration to the nose or lung may be achieved by use of a non-pressurised formulation such as an aqueous suspension. Such formulations may be administered by nebulisation i.e. by means of a nebuliser e.g. one that can be either hand-held and portable or non-portable and intended for home or hospital use. An example of such a device is a RESPIMAT inhaler.

Liquid suspension and aerosol formulations (whether pressurised or unpressurised) will typically contain the compound of the invention in particulate form, for example with a $D_{50}$ of 0.5-10 µm, suitably around 1-5 µm, such as 1-2 µm. Suitably, the compound of the invention in particulate form has a $D_{10}$ of 0.2 to 1 µm, such as 0.2 to 0.5 µm. Suitably, the compound of the invention in particulate form has a $D_{90}$ of 2 to 6 µm such as 3 to 4 µm. The particulate form of the compound may, for example, be a micronised form. Micronisation may be performed using a jet mill such as those manufactured by Hosokawa Alpine. The resultant particle size distribution may be measured using laser diffraction (e.g. with a Malvern Mastersizer 2000S instrument). Particle size distributions may be represented using $D_{10}$, $D_{50}$ and $D_{90}$ values. The Dso median value of particle size distributions is defined as the particle size in microns that divides the distribution in half. The measurement derived from laser diffraction is more accurately described as a volume distribution and consequently the $D_{50}$ value obtained using this procedure is more meaningfully referred to as a $Dv_{50}$ value (median for a volume distribution). As used herein Dv values refer to particle size distributions measured using laser diffraction. Similarly, $D_{10}$ and $D_{90}$ values, used in the context of laser diffraction, are taken to mean $Dv_{10}$ and $Dv_{90}$ values and refer to the particle size whereby 10% of the distribution lies below the $D_{10}$ value, and 90% of the distribution lies below the $D_{90}$ value, respectively.

According to one specific aspect of the invention there is provided a pharmaceutical composition comprising the compound of the invention as an aqueous suspension i.e. in particulate form suspended in an aqueous medium.

The aqueous medium typically comprises water and one or more excipients selected from buffers, tonicity adjusting agents (such as sodium chloride), pH adjusting agents, viscosity modifiers, co-solvents (such as propylene glycol) and surfactants (such as Lipoid S100).

Suitably, the aqueous medium comprises at least about 40% water such as at least about 60% water, at least about 80% water, at least about 95% water, or at least about 99% water, such as at least about 99% water.

Suitably, when Compound I is administered as an aqueous suspension, Compound I is employed as crystalline polymorphic Form 2. Suitably the concentration of Compound I in the aqueous suspension formulation is 1-10 mg/mL such as 4-6 mg/mL.

Thus, according to one embodiment, there is provided a pharmaceutical composition comprising Compound I, employed as crystalline polymorphic Form 2, in particulate form suspended in an aqueous medium.

Topical administration to the nose or lung may also be achieved by use of a pressurised aerosol formulation. Aerosol formulations typically comprise the active ingredient suspended or dissolved in a suitable aerosol propellant, such as a chlorofluorocarbon (CFC) or a hydrofluorocarbon (HFC). Suitable CFC propellants include trichloromonofluoromethane (propellant 11), dichlorotetrafluoromethane (propellant 114), and dichlorodifluoromethane (propellant 12). Suitable HFC propellants include tetrafluoroethane (HFC-134a) and heptafluoropropane (HFC-227). The propellant typically comprises 40%-99.5%, e.g. 40%-90%, by weight of the total inhalation composition. The formulation may comprise excipients including co-solvents (e.g. ethanol) and surfactants (e.g. lecithin, sorbitan trioleate and the like). Other possible excipients include polyethylene glycol, polyvinylpyrrolidone, glycerine and the like. Aerosol formulations are packaged in canisters and a suitable dose is delivered by means of a metering valve (e.g. as supplied by Bespak, Valois or 3M or alternatively by Aptar, Coster or Vari).

Topical administration to the lung may also be achieved by use of a dry-powder formulation. A dry powder formulation will contain the compound of the disclosure in particulate form, typically with an MMAD of 1-10 µm or a $D_{50}$ of 0.5-10 µm e.g. around 1-5 µm. Powders of the compound of the invention in particulate form may be prepared by a micronisation process or similar size reduction process. Micronisation may be performed and measured as described above. The formulation will typically contain a topically acceptable diluent such as lactose, glucose or mannitol (preferably lactose), usually of comparatively large particle size e.g. an MMAD of 50 µm or more, e.g. 100 µm or more or a $D_{50}$ of 40-150 µm. As used herein, the term "lactose" refers to a lactose-containing component, including α-lactose monohydrate, β-lactose monohydrate, α-lactose anhydrous, β-lactose anhydrous and amorphous lactose. Lactose components may be processed by micronisation, sieving, milling, compression, agglomeration or spray drying. Commercially available forms of lactose in various forms are also encompassed, for example Lactohale® (inhalation grade lactose; DFE Pharma), InhaLac®70 (sieved lactose for dry powder inhaler; Meggle), Pharmatose® (DFE Pharma) and Respitose® (sieved inhalation grade lactose; DFE Pharma) products. In one embodiment, the lactose component is selected from the group consisting of α-lactose monohydrate, α-lactose anhydrous and amorphous lactose. Preferably, the lactose is α-lactose monohydrate.

Dry powder formulations may also contain other excipients such as sodium stearate, calcium stearate or magnesium stearate.

A dry powder formulation is typically delivered using a dry powder inhaler (DPI) device. Example dry powder delivery systems include SPINHALER, DISKHALER, TURBOHALER, DISKUS, SKYEHALER, ACCUHALER and CLICKHALER. Further examples of dry powder delivery systems include ECLIPSE, NEXT, ROTAHALER, HANDIHALER, AEROLISER, CYCLOHALER, BREEZHALER/NEOHALER, MONODOSE, FLOWCAPS, TWINCAPS, X-CAPS, TURBOSPIN, ELPENHALER, MIATHALER, TWISTHALER, NOVOLIZER, PRESSAIR, ELLIPTA, ORIEL dry powder inhaler, MICRODOSE, PULVINAL, EASYHALER, ULTRAHALER, TAIFUN, PULMOJET, OMNIHALER, GYROHALER, TAPER, CONIX, XCELOVAIR and PROHALER.

In formulations other than aqueous suspensions, such as creams and pessaries, suitably Compound I is employed as crystalline polymorphic Form 1.

Medical Uses

Compound I is useful in the treatment of mycoses and for the prevention or treatment of disease associated with mycoses.

In an aspect of the invention there is provided use of Compound I in the manufacture of a medicament for the treatment of mycoses and for the prevention or treatment of disease associated with mycoses.

In another aspect of the invention there is provided a method of treatment of a subject with a mycosis which comprises administering to said subject an effective amount of Compound I.

In another aspect of the invention there is provided a method of prevention or treatment of disease associated with a mycosis in a subject which comprises administering to said subject an effective amount of Compound I.

In another aspect of the invention there is provided a method of treatment of a subject with a mycosis of the lung or nose (particularly the lung) which comprises administering to said subject, by inhalation, an effective amount of Compound I.

In another aspect of the invention there is provided a method of prevention or treatment of disease associated with a mycosis of the lung or nose (particularly the lung) in a subject which comprises administering to said subject, by inhalation, an effective amount of Compound I.

Mycoses may, in particular, be caused by *Aspergillus* spp. such as *Aspergillus fumigatus* or *Aspergillus pullulans* especially *Aspergillus fumigatus* Mycoses may also be caused by *Candida* spp., e.g. *Candida albicans* or *Candida glabrata*; by *Rhizopus* spp., e.g. *Rhizopus oryzae*; by *Cryptococcus* spp., e.g. *Cryptococcus neoformans*; by *Chaetomium* spp., e.g. *Chaetomium globosum*; by *Penicillium* spp., e.g. *Penicillium chrysogenum* and by *Trichophyton* spp., e.g. *Trichophyton rubrum*.

A disease associated with a mycosis is, for example, pulmonary aspergillosis.

Suitably, there is provided Compound I in the form of the Form 2 polymorph for use in the treatment of mycoses and diseases associated with a mycosis.

Alternatively, there is provided Compound I in the form of the Form 1 polymorph for use in the treatment of mycoses and diseases associated with a mycosis.

Compound I may be used in a prophylactic setting by administering Compound I prior to onset of the mycosis. For example, Compound I may be administered prophylactically to subjects at risk of developing a mycosis such as premature infants, children with congenital defects of the lung or heart, immunocompromised subjects (e.g. those suffering from HIV infection), asthmatics, subjects with cystic fibrosis, elderly subjects and subjects suffering from a chronic health condition affecting the heart or lung (e.g. congestive heart failure or chronic obstructive pulmonary disease).

Suitably, there is provided Compound I in the form of the Form 1 polymorph for use in the prevention of mycoses and diseases associated with a mycosis.

Alternatively, there is provided Compound I in the form of the Form 2 polymorph for use in the prevention of mycoses and diseases associated with a mycosis.

Subjects include human and animal subjects, especially human subjects.

The compound of the invention is especially useful for the treatment of mycoses such as *Aspergillus fumigatus* infection and for the prevention or treatment of disease associated with mycoses such as *Aspergillus fumigatus* infection in at-risk subjects. At-risk subjects are defined above.

The compound of the invention is also useful for the treatment of azole resistant mycoses such as azole resistant *Aspergillus fumigatus* infection, particularly in combination with posaconazole.

The compound of the invention may be administered in combination with a second or further active ingredient. Second or further active ingredients may, for example, be selected from other anti-fungal agents (such as voriconazole or posaconazole), amphotericin B, an echinocandin (such as caspofungin) and an inhibitor of 3-hydroxy-3-methyl-glutaryl-CoA reductase (such as lovastatin, pravastatin or fluvastatin).

Second or further active ingredients include active ingredients suitable for the treatment or prevention of a mycosis such as *Aspergillus fumigatus* infection, or disease associated with a mycosis such as *Aspergillus fumigatus* infection, or conditions co-morbid with a mycosis such as *Aspergillus fumigatus* infection.

The compound of the invention may be co-formulated with a second or further active ingredient, or the second or further active ingredient may be formulated to be administered separately, by the same or a different route.

For example, the compound of the invention may be administered to patients already being treated systemically with an anti-fungal, such as voriconazole or posaconazole.

For example, the compound of the invention may be co-administered, e.g. co-formulated, with one or more agents selected from amphotericin B, an echinocandin, such as caspofungin, and an inhibitor of 3-hydroxy-3-methyl-glutaryl-CoA reductase, such as lovastatin, pravastatin or fluvastatin.

The compound of the invention may alternatively (or in addition) be co-administered, e.g. co-formulated, with one or more agents selected from candicidin, filipin, hamycin, natamycin, nystatin, rimocidin, bifonazole, butoconazole, clotrimazole, econazole, fenticonazole, isoconazole, ketoconazole, luliconazole, miconazole, omoconazole, oxiconazole, sertaconazole, sulconazole, tioconazole, albaconazole, efinaconazole, epoxiconazole, fluconazole, isavuconazole, itraconazole, propiconazole, ravuconazole, terconazole, abafungin, amorolfin, butenafine, naftifine, terbinafine, anidulafungin, micafungin, benzoic acid, ciclopirox, flucytosine (5-fluorocytosine), griseofulvin, tolnaftate and undecylenic acid.

Preferred combination partners include intraconazole, voriconazole, caspofungin and posaconazole.

According to an aspect of the invention there is provided a kit of parts comprising: (a) a pharmaceutical composition comprising the compound of the invention optionally in combination with one or more diluents or carriers; (b) a pharmaceutical composition comprising a second active ingredient optionally in combination with one or more diluents or carriers; (c) optionally one or more further pharmaceutical compositions each comprising a third or further active ingredient optionally in combination with one or more diluents or carriers and (d) instructions for the administration of the pharmaceutical compositions to a subject in need thereof. The subject in need thereof may suffer from or be susceptible to a mycosis such as *Aspergillus fumigatus* infection.

The compound of the invention may be administered at a suitable interval, for example once per week, once every other day, once per day, twice per day, three times per day or four times per day.

A suitable dose amount for a human of average weight (50-70 kg) is expected to be around 50 µg to 10 mg/day e.g. 500 µg to 5 mg/day although the precise dose to be administered may be determined by a skilled person.

Compound I in the crystalline form of polymorphic Form 1 is expected to have one or more of the following favourable attributes:
- to exhibit a wide range of thermal stability, as evidenced by a high melting point (>200° C.);
- to be susceptible to micronisation whilst maintaining its polymorphic integrity; and
- to resist conversion into Form 2, in formulations intended for its administration such as in formulations other than aqueous suspensions.

Compound I in the crystalline form of polymorphic Form 2 is expected to have one or more of the following favourable attributes:
- to exhibit a wide range of thermal stability as evidenced by a high melting point (>180° C.);
- to possess efficacious bioavailability for a topical medicine, in particular one intended for treating diseases of the lung and to display higher bioavailability than that of Form 1 when administered by inhalation as an aqueous suspension;
- to be susceptible to micronisation whilst maintaining its polymorphic integrity; and
- to resist conversion into Form 1 in aqueous suspensions intended for use in its administration to patients.

EXPERIMENTAL

Abbreviations

Any abbreviations not defined are intended to convey their generally accepted meaning.
aq aqueous
AUC area under the curve
BW group mean body weight
conc. concentration
c-hexane cyclohexane
D duration of exposure
DME 1,2-dimethoxyethane
DMSO dimethyl sulfoxide
DSC differential scanning calorimetry
$Et_2O$ diethyl ether
EtOH ethanol
Exp experiment
Evap evaporation
$^1$H-NMR proton nuclear magnetic resonance (spectroscopy)
HPLC high pressure liquid chromatography
i-BuOH iso-butanol (2-methyl-1-propanol)
IPA iso-propyl alcohol (2-propanol)
$K_2$EDTA dipotassium ethylenediaminetetraacetic acid
KF Karl Fischer (titration)
LC-MS/MS liquid chromatography-tandem mass spectrometry
LGC liquid-gas chromatography
2-ME 2-methoxyethanol
MeCN acetonitrile
MEK methyl ethyl ketone
$MeNO_2$ nitromethane
MIBK methyl isobutyl ketone
min minute(s)
MMAD mass median aerodynamic diameter
MTBE methyl tent-butyl ether
N/A not applicable
NMP N-methylpyrrolidone
No number
PLM polarised light microscopy
PrOAc propyl acetate
RH relative humidity
RSD relative standard deviation
RT room temperature
RV reverse phase
TBME tertiary butyl methyl ether
temp temperature
TGA thermo-gravimetric analysis
THF tetrahydrofuran
vol volume(s)
SC single crystal
TBME tert-butyl methyl ether
sec second(s)
UPLC ultra-high performance liquid chromatography
VT variable temperature
XRPD x-ray powder diffraction (crystallography)

Instruments and Methodology

The following descriptions of instruments, methodologies and procedures, pertain to experiments which were performed in a number of different laboratories and locations, thereby necessitating the use of a variety of the same, equivalent in their effect. It will be appreciated by those skilled in the art that many such parameters may be varied, without impeding the desired result. Therefore whilst such instruments, methodologies and processes described hereinbelow have been used in some circumstances, they also constitute exemplary experimental conditions which may be used to practise the present invention. Thus, the instruments, methodologies and processes which follow are not to be construed as limiting the present invention in any way.

X-Ray Powder Diffraction

X-Ray powder diffraction patterns were collected on a PANalytical diffractometer using Cu Kα radiation (45 kV, 40 mA), θ-θ goniometer, focusing mirror, divergence slit (½"), soller slits at both incident and divergent beam (4 mm) and a PIXcel detector. The software used for data collection was X'Pert Data Collector, version 2.2f and the data was presented using X'Pert Data Viewer, version 1.2d. XRPD patterns were acquired under ambient conditions via a transmission foil sample stage (polyimide—Kapton, 12.7 µm thickness film) under ambient conditions using a PANalytical X'Pert PRO. The data collection range was 2.994-35°2θ with a continuous scan speed of 0.202 s$^{-1}$.

Alternatively, X-Ray powder diffraction patterns were collected on a Bruker AXS C2 GADDS diffractometer using Cu Kα radiation (40 kV, 40 mA), using an automated XYZ stage, laser video microscope for auto-sample positioning and a HiStar 2-dimensional area detector. X-ray optics consisted of a single Göbel multilayer mirror coupled with a pinhole collimator of 0.3 mm. A weekly performance check was carried out using a certified standard NIST 1976 Corundum (flat plate). The beam divergence was approximately 4 mm. A θ-θ continuous scan mode was employed with a sample to detector distance of 20 cm, thereby providing an effective 2θ range of 3.2°-29.7°. Typically samples were exposed to the X-ray beam for 120 sec. The software used for data collection was GADDS for XP/2000 4.1.43 and the data were analysed and presented using Diffrac Plus EVA v15.0.0.0.

Samples run under ambient conditions were prepared as flat plate specimens using powder, as received, without grinding. Approximately 1-2 mg of the sample was lightly pressed on a glass slide to obtain a flat surface. Samples run under non-ambient conditions were mounted on a silicon wafer with heat-conducting compound. The sample was then heated to the appropriate temperature at 20° C./min and subsequently held isothermally for 1 min before data collection was initiated.

X-Ray powder diffraction patterns were collected on a Bruker D8 diffractometer using Cu Kα radiation (40 kV, 40 mA), θ-2θ goniometer, and divergence of V4 and receiving slits, a Ge monochromator and a Lynxeye detector. The instrument was checked for its performance using a certified Corundum standard (NIST 1976). The software used for data collection was Diffrac Plus XRD Commander v2.6.1 and the data were analysed and presented using Diffrac Plus EVA v15.0.0.0.

Samples were run under ambient conditions as flat plate specimens using powder as received. The sample was gently packed into a cavity cut into polished, zero-background (510) silicon wafer. The sample was rotated in its own plane during analysis. Data was collected as follows:
Angular range: 2° to 42° 2θ
Step size: 0.05° 2θ
Collection time: 0.5 sec/step Diamond Light Source X-Ray Crystallography The data was collected on a Fluid Film Devices 3-circle diffractometer using a Dectris Pilatus 2M detector. The crystal was mounted in a MiTeGen loop using a perfluoropolyether oil. The wavelength used was 0.6889 Å. All data were collected at 295 K. The structure was solved by routine automatic direct methods and refined by least-squares refinement on all unique measured F$^2$ values.

$^1$H NMR Spectroscopy

NMR spectra were collected on a Bruker 400 MHz instrument equipped with an auto-sampler and controlled by a DRX400 console. Automated experiments were acquired using ICON-NMR v4.0.7 running with Topspin v1.3 using the standard Bruker loaded experiments. For non-routine spectroscopy, data were acquired through the use of Topspin alone. Samples were prepared in DMSO-d$_6$, unless otherwise stated. Off-line analysis was carried out using ACD Spectrus Processor 2012.

Differential Scanning Calorimetry

DSC data were collected on a TA Instrument Q2000 equipped with a 50 position auto-sampler. The calibration for thermal capacity was carried out using sapphire and the calibration for energy and temperature was carried out using certified indium. Typically 0.5-3 mg of sample, contained in a pin-holed aluminium pan, was heated at 10° C./min from 25° C. to 300° C. (for slow scan rates) or at 40° C./min from 25° C. to 300° C. (for fast scanning rates). A purge of dry nitrogen at 50 mL/min was maintained over the sample. The instrument control software was Advantage for Q Series v2.8.0.394 and Thermal Advantage v5.5.3 and the data were analysed using Universal Analysis v4.5A.

Thermo-Gravimetric Analysis

TGA data were collected on a TA Instrument Q500 TGA, equipped with a 16 position auto-sampler. The instrument was temperature calibrated using certified Alumel and Nickel. Typically 5-10 mg of sample was loaded onto a pre-tared aluminium DSC pan and heated at 10° C./min from ambient temperature to 350° C. A nitrogen purge at 60 mL/min was maintained over the sample. The instrument control software was Advantage for Q Series v2.5.0.256 and Thermal Advantage v5.5.3 and the data were analysed using Universal Analysis v4.5A.

Chemical Purity Determination by HPLC

Purity analysis was performed on an Agilent HP1100 series system equipped with a diode array detector using ChemStation software vB.04.03. Samples were prepared by dissolution in aq MeCN (1:1 mixture) by heating to 50° C. to give a 0.5 mg/mL solution. Samples were run using the parameters given below (Table 2).

TABLE 2

HPLC Parameters/Method for Chemical Purity Determinations.

| Column | Supelco Ascentis Express C18 |
| --- | --- |
| Column Dimensions | 100 × 4.6 mm × 2.7 µm |
| Column Temp | 25° C. |
| Injection Vol | 5 µL |
| Detection Wavelength | 255 nm |
| Flow Rate | 2 mL/min |
| Phase A | 0.1% TFA in water |
| Phase B | 0.085% TFA in MeCN |

| Gradient Elution Timetable | | |
| --- | --- | --- |
| Time (min) | % Phase A | % Phase B |
| 0 | 95 | 5 |
| 6 | 5 | 95 |
| 6.2 | 95 | 5 |
| 8 | 95 | 5 |

Preparation of Form 1 and Form 2 Polymorphs

Reference to "crude input material" herein is taken to mean Form 3 which was synthesised and isolated according to any one of the methods discussed above. A representative reference XRPD trace of this material is shown in FIG. 7 and is consistent with a material of low crystallinity.

Preparation of Micronised Form 1 via Recrystallisation from Aqueous Acetone (5% H$_2$O v/v)

Figure 9:
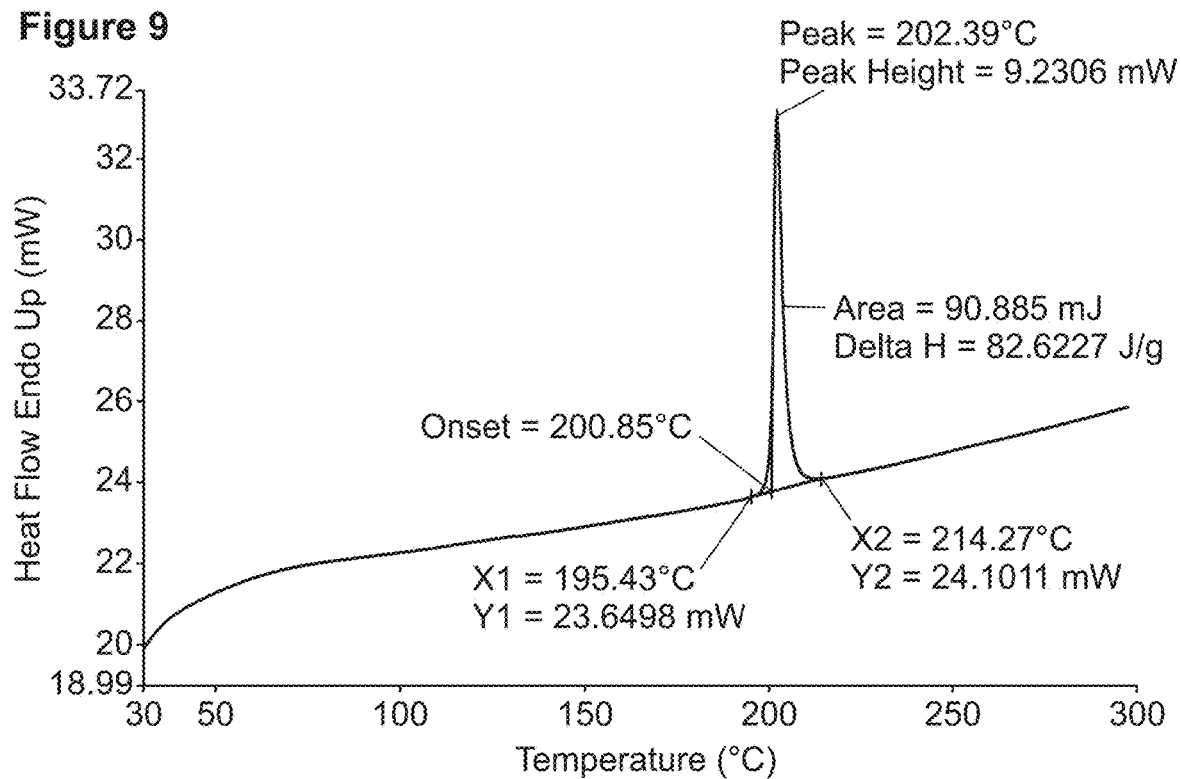
FIG. 9: DSC trace of polymorphic Form 1 obtained from aqueous acetone (5% H$_2$O).
Figure 10:
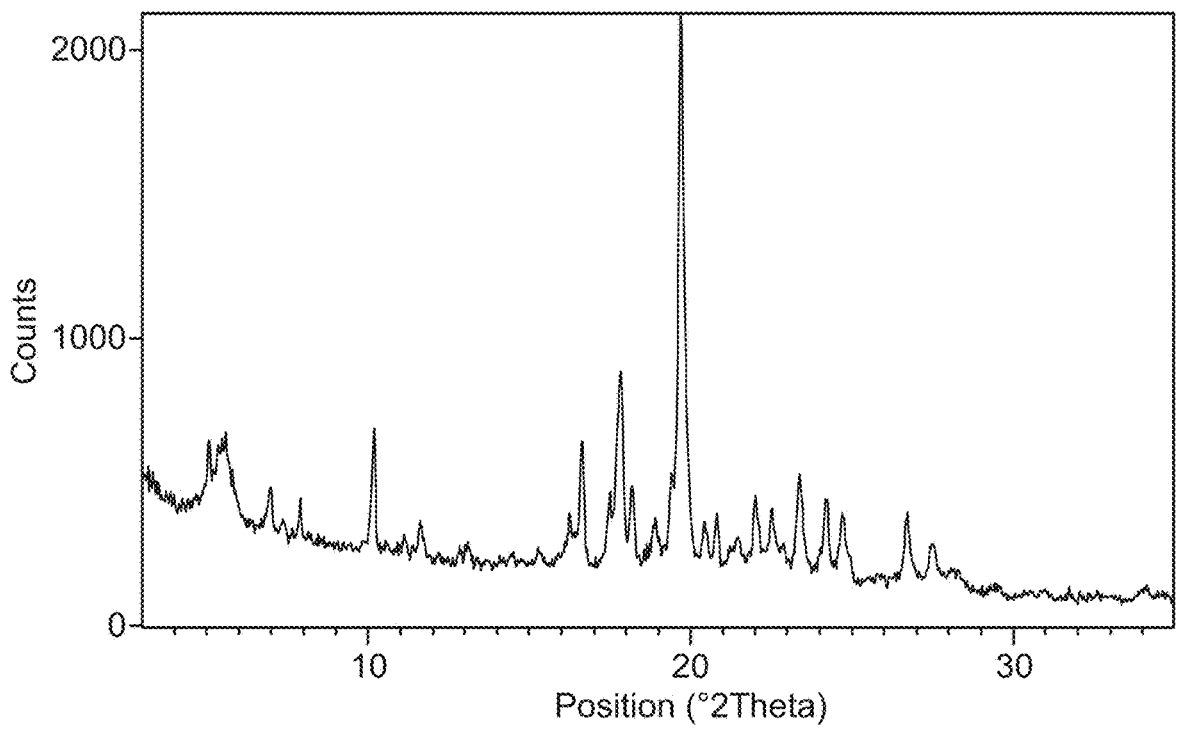
FIG. 10: XRPD pattern of polymorphic Form 1 obtained from aqueous acetone (5% H$_2$O) after micronisation.

A sample of crude input material (100 g, Form 3) was suspended in a mixture of 5% water in acetone (1.00 L), a seed of Form 1 (100 mg) was added and the mixture was stirred at RT overnight. The suspension was filtered and the filter cake was washed with a mixture of 5% water in acetone (20 mL) and the solids dried at 40° C. to provide polymorphic Form 1 as a white powder (85.5 g, 85.5% recovery, 98.7% purity by HPLC) as determined from its DSC trace (FIG. 9). Micronisation of the product so obtained provided a powder for which the particle size distribution, expressed in D values, was as follows: $D_{10}$=0.75 μM; $D_{50}$=1.59 μM and $D_{90}$=3.23 μM. The XRPD trace of the micronised solid (FIG. 10) confirmed that its polymorphic integrity was retained during this process.

Preparation of Form 2 Polymorph by Maturation in MIBK

Crude input material (10 g) was suspended in MIBK (30 vol, 300 mL) at RT. The suspension was matured between 25° C. and 50° C. (heat-cool cycle, 8 hr per cycle) for 24 hr. An aliquot was collected after 3 hr at 50° C., filtered, air dried and analysed by XRPD. After 24 hr the remaining solid was filtered at RT and air dried for 2 hr. The solid obtained was designated the Form 2 polymorph. The XRPD pattern of a representative sample is shown in FIG. 2.

Preparation of Micronised Form 2 via Recrystallisation from THF/TBME

Figure 11:
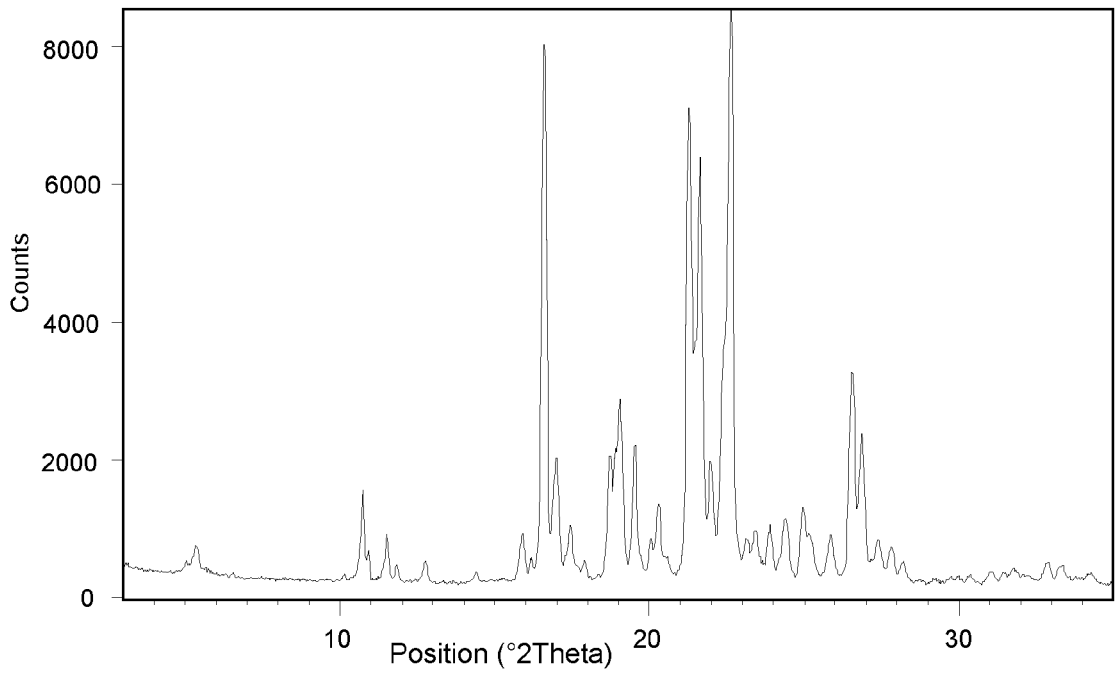
FIG. 11: XRPD trace of polymorphic Form 2 obtained from THF/TBME.
Figure 12:
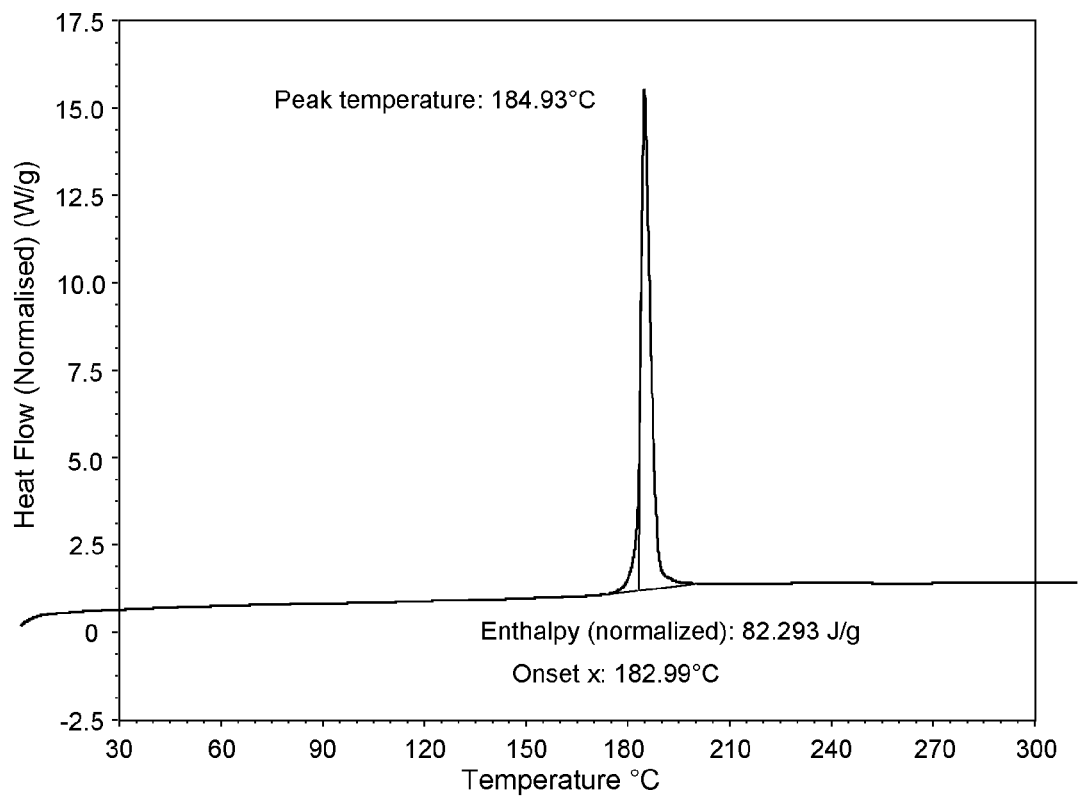
FIG. 12: DSC trace of polymorphic Form 2 obtained from THF/TBME.

Crude input material (476.4 g) was taken up into THF (3.82 L) at 45-55° C. under nitrogen. The warm solution was clarified through an in-line filter whilst maintaining an internal temperature of 45-55° C. TBME (0.72 L) was added dropwise over a period of 1.5 hr whilst maintaining an internal temperature of 45-55° C. Seeds of the Form 2 polymorph (500 mg) were added followed by the dropwise addition of clarified TBME (5.01 L) over 10.5 hr at 45-55° C. After the addition was complete the mixture was cooled to 0° C. over 3.5 hr. Stirring was continued at this temperature for a further 7.5 hr and the resulting suspension was filtered in vacuo and the solids washed with a mixture of clarified THF (380 mL) and TBME (570 mL). The filter cake was sucked dry and the isolated solids were dried in vacuo at 45° C. under nitrogen for 21 hr to give an off-white solid (401.4 g, 84.2%) confirmed to be the Form 2 polymorph by XRPD and DSC analyses (FIGS. 11 and 12 respectively).

Figure 13:
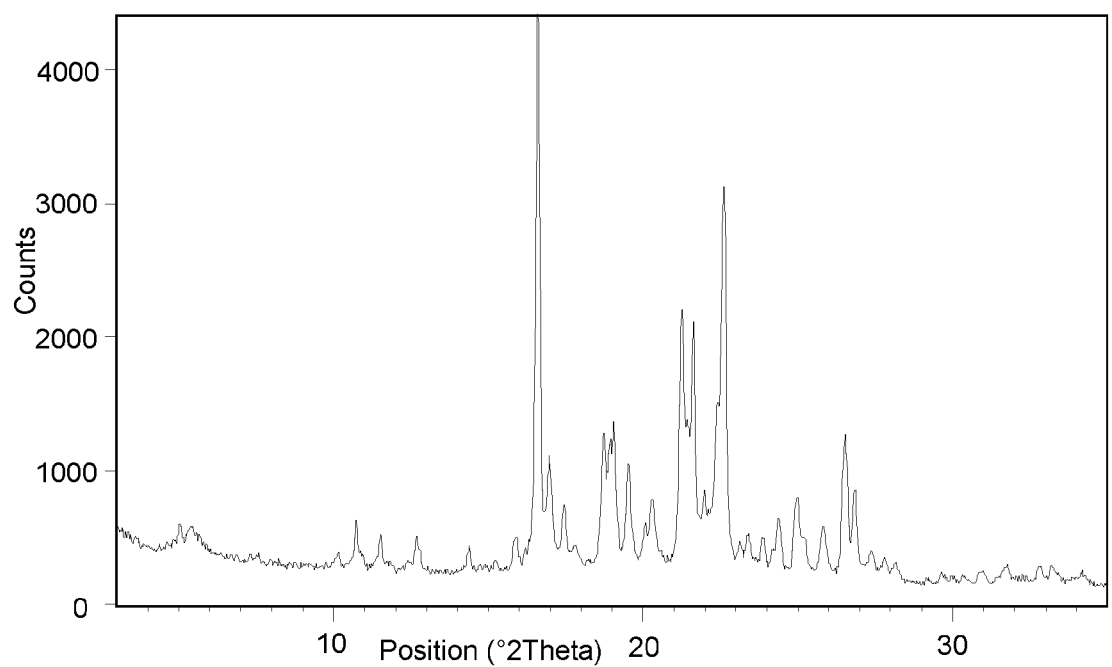
FIG. 13: High resolution XRPD pattern of polymorphic Form 2 obtained from THF/TBME, after micronisation.

Micronisation of the product so obtained provided a powder for which the particle size distribution, expressed in D values, was as follows: $D_{10}$=0.42 μM; $D_{50}$=1.24 μM and $D_{90}$=3.57 μM. It will be appreciated by those skilled in the art that these characteristics are suitable for a product intended for administration by inhalation. The maintenance of polymorphic integrity during micronisation was confirmed from the XRPD trace obtained after milling (FIG. 13) which shows no significant change compared with that obtained before particle size reduction was undertaken (FIG. 11). The Form 2 polymorph is therefore susceptible to and stable towards the micronisation process required to derive a material with the properties necessary for its intended purpose.

Characterisation of Form 1 and Form 2 Polymorphs

X-Ray Powder Crystallography

High resolution XRPD traces of polymorphic Form 1 (FIG. 1) and of Form 2 (FIG. 2) which were prepared by methods disclosed herein show distinctly different patterns which are characteristic of the two alternative solid states. The experimentally determined patterns were found to be in agreement with those calculated from data collected on the synchrotron source (FIGS. 5 and 6 respectively), from which the crystal structures were derived. Comparison of the two patterns (FIGS. 3 and 4) demonstrates the reliability of XRPD analysis to determine the polymorphic nature of a given sample. The 2θ values (in degrees), d-spacing and relative intensities of peaks, derived from their respective XRPD traces, that characterise the Form 1 and 2 polymorphs, are tabulated below (Table 3).

TABLE 3

Powder X-ray Diffraction Peaks for Polymorphic Forms 1 and 2 of Compound I.

| Form 1 | | | Form 2 | | |
| --- | --- | --- | --- | --- | --- |
| 2θ Value | d-spacing (Å) | Rel Intensity (%) | 2θ Value | d-spacing (Å) | Rel Intensity (%) |
| 5.06 | 17.46 | 12.95 | 5.37 | 16.44 | 4.84 |
| 5.65 | 15.65 | 6.09 | 10.75 | 8.23 | 16.17 |
| 6.99 | 12.64 | 12.06 | 11.54 | 7.67 | 8.23 |
| 7.35 | 12.02 | 5.80 | 11.85 | 7.47 | 3.04 |
| 7.91 | 11.18 | 6.55 | 12.77 | 6.93 | 3.63 |
| 8.15 | 10.85 | 3.43 | 14.41 | 6.15 | 2.05 |
| 10.17 | 8.70 | 21.46 | 15.88 | 5.58 | 8.28 |
| 11.13 | 7.95 | 2.80 | 16.19 | 5.48 | 3.95 |
| 11.60 | 7.63 | 7.57 | 16.61 | 5.33 | 94.97 |
| 12.84 | 6.89 | 2.75 | 17.02 | 5.21 | 22.15 |
| 13.11 | 6.75 | 3.15 | 17.45 | 5.08 | 10.17 |
| 14.51 | 6.10 | 3.51 | 17.91 | 4.95 | 3.92 |
| 15.28 | 5.80 | 2.80 | 18.72 | 4.74 | 22.45 |
| 15.88 | 5.58 | 2.71 | 19.08 | 4.65 | 31.18 |
| 16.28 | 5.45 | 10.51 | 19.52 | 4.55 | 24.12 |
| 16.66 | 5.32 | 25.57 | 20.05 | 4.43 | 7.78 |
| 17.49 | 5.07 | 13.92 | 20.29 | 4.38 | 13.83 |
| 17.85 | 4.97 | 37.53 | 21.28 | 4.18 | 82.09 |
| 18.17 | 4.88 | 14.59 | 21.66 | 4.10 | 73.31 |
| 18.82 | 4.71 | 10.26 | 22.00 | 4.04 | 21.08 |
| 19.38 | 4.58 | 13.53 | 22.38 | 3.97 | 38.28 |
| 19.70 | 4.51 | 100.00 | 22.65 | 3.93 | 100.00 |
| 20.43 | 4.35 | 8.01 | 23.16 | 3.84 | 7.67 |
| 20.83 | 4.26 | 8.72 | 23.43 | 3.80 | 9.21 |
| 21.26 | 4.18 | 6.69 | 23.89 | 3.73 | 8.79 |
| 21.53 | 4.13 | 6.81 | 24.43 | 3.64 | 11.18 |
| 21.00 | 4.04 | 13.99 | 24.94 | 3.57 | 12.45 |
| 22.52 | 3.95 | 14.36 | 25.20 | 3.53 | 8.40 |
| 22.87 | 3.89 | 5.00 | 25.89 | 3.44 | 8.37 |
| 23.32 | 3.81 | 21.62 | 26.56 | 3.36 | 36.79 |
| 24.20 | 3.68 | 15.27 | 26.88 | 3.32 | 25.43 |
| 24.67 | 3.61 | 12.85 | 27.35 | 3.26 | 7.51 |
| 25.00 | 3.56 | 2.49 | 27.83 | 3.21 | 6.36 |
| 25.46 | 3.50 | 1.14 | 28.23 | 3.16 | 3.86 |
| 25.90 | 3.44 | 1.80 | 30.37 | 2.94 | 1.53 |
| 26.26 | 3.39 | 2.58 | 31.04 | 2.88 | 1.93 |
| 26.69 | 3.34 | 12.65 | 31.78 | 2.82 | 2.51 |
| 27.44 | 3.25 | 8.81 | 32.92 | 2.72 | 3.62 |
| 28.10 | 3.18 | 4.18 | 33.30 | 2.69 | 3.08 |
| 28.37 | 3.15 | 3.22 | 34.23 | 2.62 | 1.65 |
| 29.50 | 3.03 | 1.69 | | | |
| 30.52 | 2.93 | 0.62 | | | |
| 31.07 | 2.88 | 0.51 | | | |

TABLE 3-continued

Powder X-ray Diffraction Peaks for Polymorphic Forms 1 and 2 of Compound I.

| Form 1 | | | Form 2 | | |
|---|---|---|---|---|---|
| 2θ Value | d-spacing (Å) | Rel Intensity (%) | 2θ Value | d-spacing (Å) | Rel Intensity (%) |
| 31.70 | 2.82 | 0.80 | | | |
| 32.77 | 2.73 | 0.29 | | | |
| 33.10 | 2.71 | 0.32 | | | |
| 33.83 | 2.65 | 0.95 | | | |
| 34.15 | 2.63 | 1.52 | | | |

Figure 14:
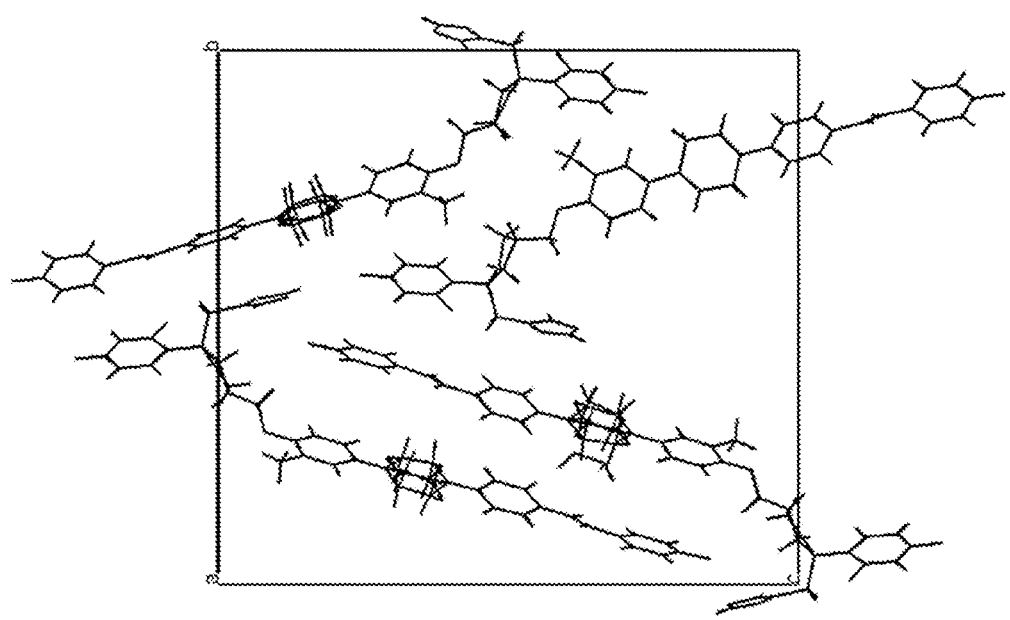
FIG. 14: Crystal structure of polymorphic Form 1 viewed along the a-axis

Structure Determination of Forms 1 and 2 by Synchrotron Light Source X-Ray Crystallography Structure determinations for polymorphic Forms 1 and 2 were undertaken at the Diamond Light Source, Oxfordshire, UK. Data from Form 1 were collected from a 7×12×140 μm single crystal on beamline I19. The crystal data and structure refinement parameters for the Form 1 crystalline polymorph are given below (Table 4) and an image of the solved structure viewed along its a-axis included herein (FIG. 14).

TABLE 4

Crystal Data and Structure Refinement Parameters for Polymorphic Form 1.

| Empirical formula | $C_{38} H_{37} F_3 N_6 O_3$ |
|---|---|
| Formula weight | 682.73 |
| Temperature | 295(2) K |
| Wavelength | 0.6889 Å |
| Crystal system | Orthorhombic |
| Space group | P 21 21 21 |
| Unit cell dimensions | a = 16.7962(3) Å   α = 90° |
| | b = 23.5841 (6) Å   β = 90° |
| | c = 25.5756(6) Å   γ = 90° |
| Volume | 10131.1(4) Å$^3$ |
| Z | 12 |
| Density (calculated) | 1.343 mg/m$^3$ |
| Absorption coefficient | 0.059 mm$^{-1}$ |
| F(000) | 4296 |
| Crystal size | 7 × 12 × 140 μm |
| Theta range for data collection | 1.406 to 24.226° |

Figure 15:
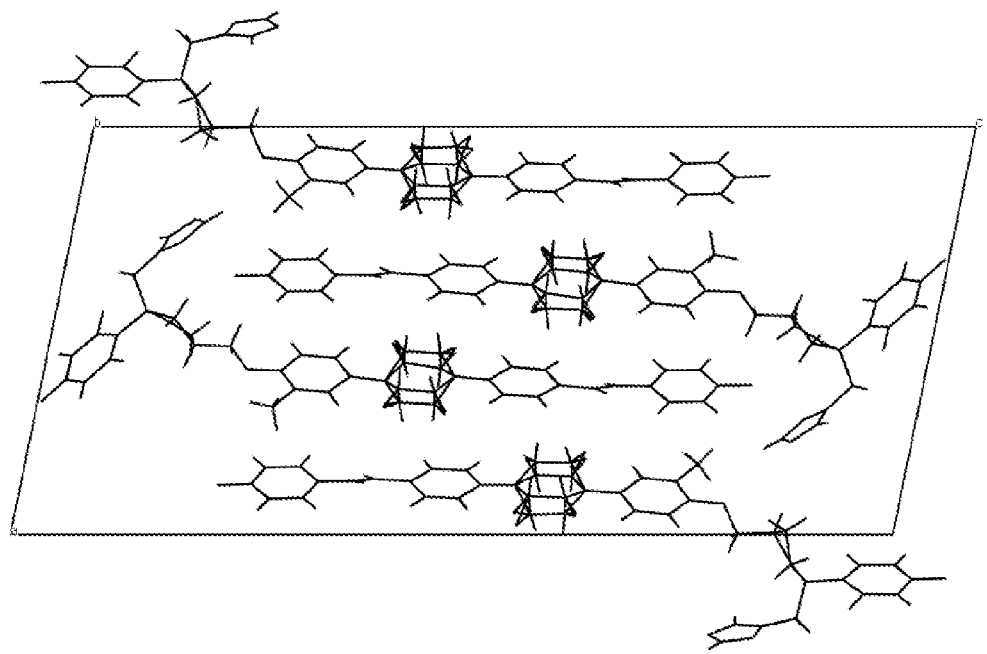
FIG. 15: Crystal structure of polymorphic Form 2 viewed along the b-axis

Data for Form 2 were collected from a 5×5×50 μm single crystal on beamline I19. The crystal data and structure refinement parameters for the Form 2 crystalline polymorph are given below (Table 5) and an image of the solved structure, viewed along its b-axis, included herein (FIG. 15).

TABLE 5

Crystal Data and Structure Refinement Parameters for Polymorphic Form 2.

| Empirical formula | $C_{38} H_{37} F_3 N_6 O_3$ |
|---|---|
| Formula weight | 682.73 |
| Temperature | 295(2) K |
| Wavelength | 0.6889 Å |
| Crystal system | Monoclinic |
| Space group | P 21 |
| Unit cell dimensions | a = 16.8148(7) Å   α = 90° |
| | b = 5.6467(2) Å   β = 101.540(3)° |
| | c = 35.5556(11) Å   γ = 90° |
| Volume | 3307.7(2) Å$^3$ |
| Z | 4 |
| Density (calculated) | 1.371 mg/m$^3$ |
| Absorption coefficient | 0.060 mm$^{-1}$ |

TABLE 5-continued

Crystal Data and Structure Refinement Parameters for Polymorphic Form 2.

| F(000) | 1432 |
|---|---|
| Crystal size | 5 × 5 × 50 μm |
| Theta range for data collection | 1.133 to 24.246° |

Thermodynamic Stability Relationships

Thermodynamic Stability of Polymorphic Forms 1 and 2 at Varying Temperatures

A mixture of equal amounts Forms 1 and 2 (100 mg) was charged to crystallisation tubes followed by the selected solvent. The suspensions were heated to the temperatures indicated (Table 6) for 72 hr, during which time samples were taken at 24 hr intervals Solids were isolated at the maturation temperature by filtration and then dried in vacuo at 45° C. for 20 hr. In two cases (Table 6, Entries 1 and 2) suspensions were retained at 135° C. which comprised Form I from the 24 hr time point to the conclusion of the experiment. In the remaining cases (Table 6, Entries 4-6) solutions had formed at 72 hr and solids were recovered by slight cooling, all of which were determined to be Form 1. Those maturated at lower temperatures all gave Form 2 within 24 hr.

TABLE 6

XRPD Analysis of Suspensions of Forms 1 and 2 Matured at Varying Temperatures

| | | Polymorph obtained at temp indicated$^a$ (° C.) | | |
|---|---|---|---|---|
| Entry | Solvent | 50 | 70 | 135 |
| 1 | xylenes | 2 | 2 | 1 |
| 2 | mesitylene | 2 | 2 | 1 |
| 3 | diphenyl ether | 2 | 2 | 1$^b$ |
| 4 | decalin | 2 | 2 | 1$^b$ |
| 5 | heptanol | 2 | 2 | 1$^b$ |
| 6 | p-cymene | 2 | 2 | 1$^b$ |

Footnotes:
$^a$ As determined by XRPD analysis after 72 hr;
$^b$Dissolution occurred at this temp; solid obtained on slight cooling.

Profiling by Differential Scanning Calorimetry

DSC investigations were carried out according to methods described above.

Figure 8:
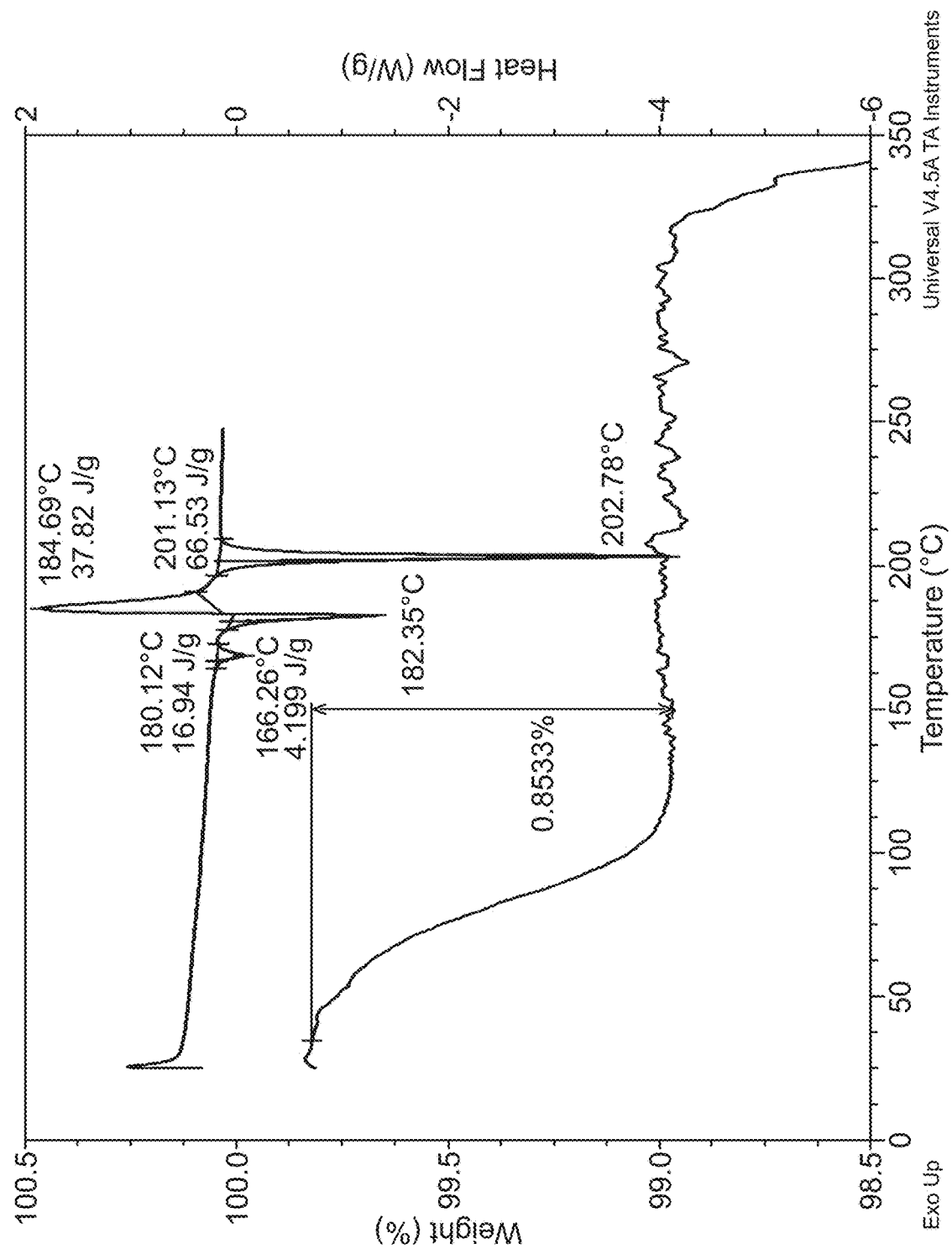
FIG. 8: Thermal analysis (DSC and TGA) of crude input material (polymorphic Form 3).

A sample of crude input material of 98.4% purity was subjected to differential scanning calorimetry which showed a number of thermal events on heating the sample. A small endotherm at 166° C. preceded a second, larger endotherm at 180° C. which was followed almost immediately by an exotherm at ~183° C. and final endotherm at ~201° C. (see FIG. 8). These analyses reveal a series of thermally-induced transformations occur during which the initial, poorly crystalline material (Form 3) converts into polymorphic Form 2 (m.p. 180-185° C.), which then melts and is transformed into Form 1 (m.p. 201-202° C.).

To obtain an accurate value for the heat of fusion ($\Delta H_f$) of polymorphic Form 1 and polymorphic Form 2, fast scanning DSC (using a heating rate at 40° C./min) was used to eliminate the recrystallisation event of Form 1 from the melt of Form 2 that occurs at slower scan rates (10 C/min). Replicate analysis (n=10) of the same samples of the polymorphs showed that Forms 1 and 2 had mean heats of fusion of 72.28 J/g and 77.15 J/g respectively (Table 7).

TABLE 7

Fusion Data from Fast Scanning DSC Traces for Forms 1 and 2.

| Polymorph | Onset Temp ° C. (% RSD) | Peak Temp ° C. (% RSD) | Linear Enthalpy J/g (% RSD) |
|---|---|---|---|
| Form 1 | 202.6 (0.08) | 203.5 (0.10) | 72.28 (0.89) |
| Form 2 | 182.6 (0.05) | 183.7 (0.12) | 77.15 (0.61) |

Figure 16:
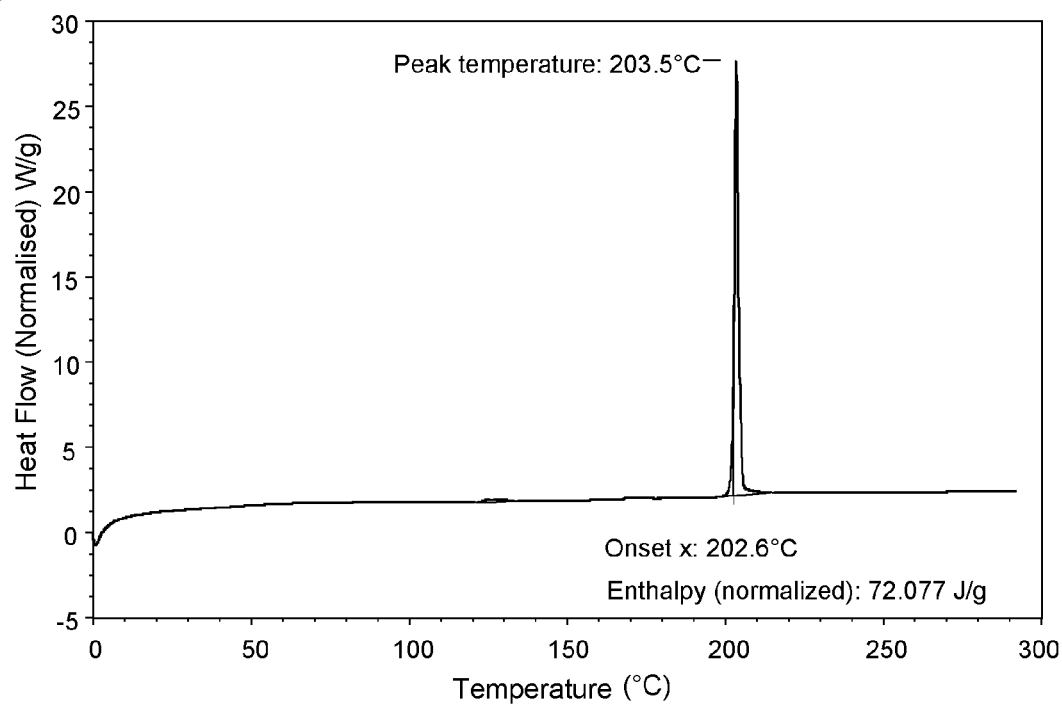
FIG. 16: Fast scanning DSC trace of polymorphic Form 1 (40° C./min).
Figure 17:
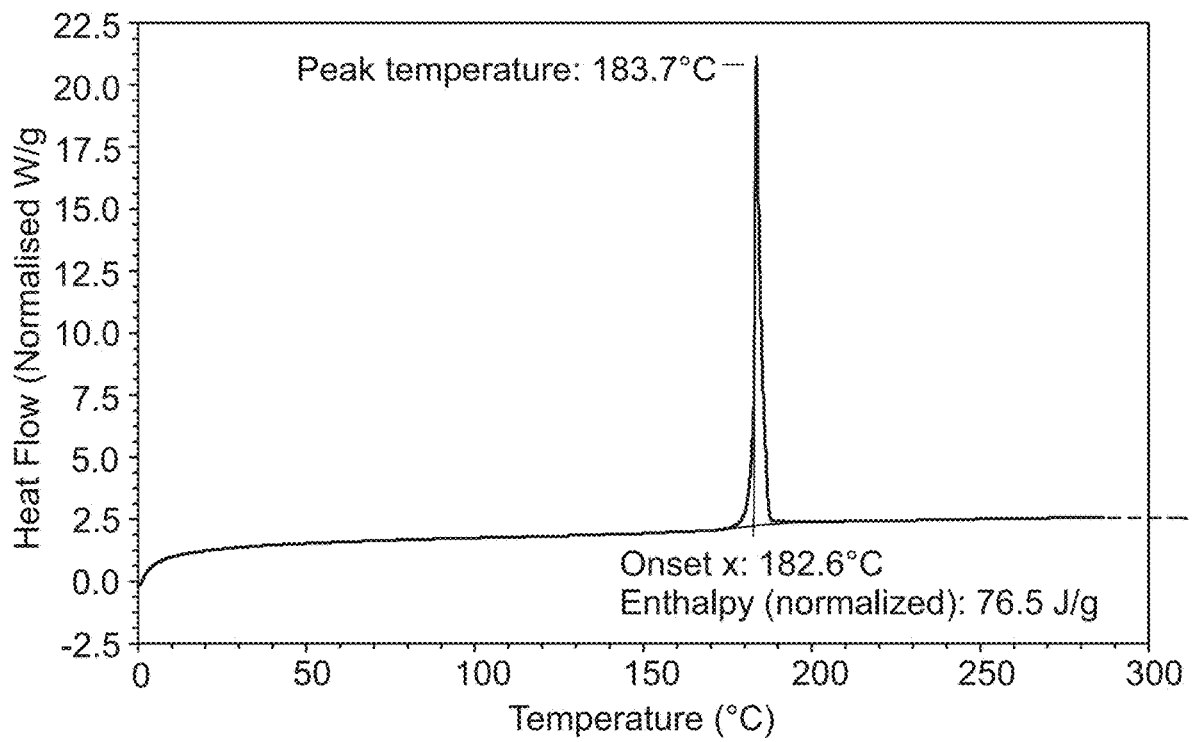
FIG. 17: Fast scanning DSC trace of polymorphic Form 2 (40° C./min).

FIG. 16 comprises a fast scanning DSC trace of this sample of polymorphic Form 1 and reveals that it has a melting point of 202.6° C. Similarly, FIG. 17 displays a fast scanning DSC trace of this sample of polymorphic Form 2 and shows that this form has a melting point of 182.6° C.

The rules of Burger and Ramburger (1979) state that "if the higher melting form has the lower heat of fusion the two forms are usually enantiotropic, otherwise they are monotropic". DSC analysis of multiple batches confirmed that the heat of fusion of Form 1 was consistently less than that of Form 2 from which it can be concluded that polymorphic Forms 1 and 2 are enantiotropically related. It follows that Form 2 is the more thermodynamically stable state (has the lowest Gibbs free energy) from absolute zero up to a transition point, which is the temperature at which Forms 1 and 2 have equal thermodynamic stability. Above this transition temperature the Form 1 polymorph is the more thermodynamically preferred until its melting point is reached.

Thermo-Gravimetric Analysis (TGA)

TGA profiling was carried out according to methods described above and was used to determine the amount of residual solvents associated with the polymorphs of Compound I. In addition, it was used to measure the quantity of solvent released on heating from the solvated forms of Compound I. Typical residual solvent levels found in samples of the polymorphs of Compound I are as follows.

The Form 1 polymorph prepared from toluene showed a weight reduction of 0.3% w/w on heating from 25-120° C., consistent with the loss of 0.1 mol of water. Degradation was evident from 320° C. (data not shown).

Figure 18:
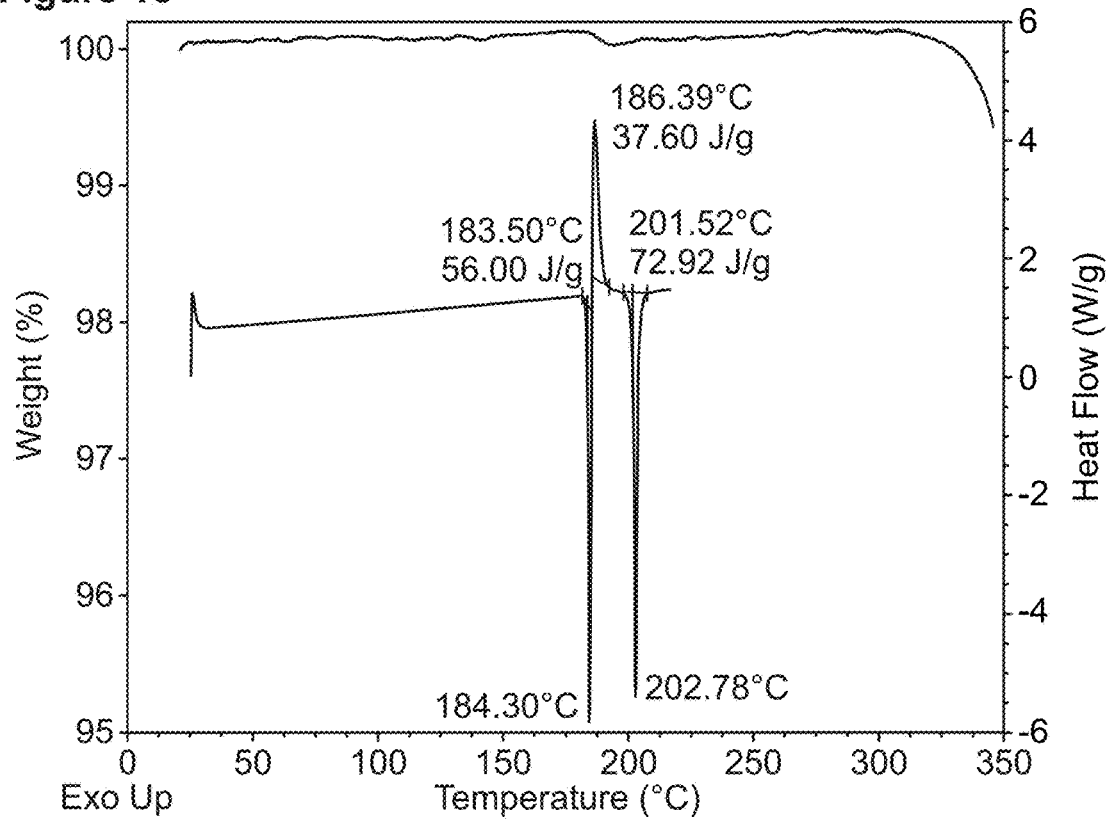
FIG. 18: Thermal analysis (DSC and TGA) of polymorphic Form 2 obtained from MIBK.

The sample of Form 2 derived from EtOH exhibited a 0.2% w/w drop in weight from 25-150° C., ascribed to the loss of 0.03 mol of EtOH, Degradation of Compound I started at 320° C. The Form 2 polymorphic material isolated from MIBK revealed no weight loss until the sample begun to degrade at 320° C. (FIG. 18). The anisole solvate experienced a 13.4% w/w loss when the sample was heated from 25 and 160° C. (data not shown).

Slurrying and Cross-Seeding Experiments

A mixture of Forms 1 and 2 (50% w/w) was prepared and a sample of the mixture (20 mg) was then suspended in a solvent system (50 vol, 1.0 mL) and shaken at different temperatures for 96 hr. The solids were filtered, air dried and analysed by XRPD. The results obtained (Table 8) reveal that, in all but one of the systems investigated (Entries 10-12), the mixture of polymorphic forms had turned over into Form 2 when maintained at both RT and 50° C. The transformation in propyl acetate was seen to be especially facile as Form 2 was also isolated from the suspension which had been maintained at 5° C. (Entry 1). Notably, the conversion was seen to occur not only in this solvent and in TBME (Entries 4-6), but also in the aromatic solvent toluene (Entries 7-9) which had previously delivered Form 1 from crude input material (Form 3). The material recovered from aqueous isopropyl alcohol was found to be a mixture of both forms (Entries 10-12).

TABLE 8

Cross-seeding Experiments of Forms 1 and 2 at 5° C., 25° C. and 50° C..

| Entry | Solvent System | Temp ° C. | Polymorphic Form by XRPD |
|---|---|---|---|
| 1 | PrOAc | 5 | 2 |
| 2 |  | 25 |  |
| 3 |  | 50 |  |
| 4 | TBME | 5 | 1 and 2 |
| 5 |  | 25 | 2 |
| 6 |  | 50 |  |
| 7 | Toluene | 5 | 1 and 2 |
| 8 |  | 25 | 2 |
| 9 |  | 50 |  |
| 10 | IPA: | 5 | 1 and 2 |
| 11 | Water | 25 |  |
| 12 | (5%) | 50 |  |

Footnote:
All samples remained as suspensions during maturation

This observation suggests either that the solubility of Compound I is too low in this solvent system for a complete transformation to occur or that these conditions are intrinsically less favourable for the transformation of Form I into Form 2. In order to determine the influence of water in determining the output from such conditioning experiments, the behaviour of the Form 2 polymorph was examined in nominally dry organic media and also in monophasic, aqueous mixtures with water miscible solvents.

When the Form 2 solid was suspended in heptane, TBME, toluene or in cyclohexane, as the sole solvent, at both 25 or 50° C. for a period of 24 hr, no perceptible change in crystal structure occurred. The same result was also obtained when the conditioning medium was either neat acetone (Table 9, Entries 1 and 6) or water alone (Table 9, Entries 5 and 10). However, in acetone-water mixtures at 50° C. over 24 hr there was clear evidence that in two instances Form 2 had been transformed into Form 1 (Table 9, Entries 7 and 9). This result was unexpected given that this polymorph of Compound I is metastable in this temperature range compared to Form 2.

TABLE 9

The Fate of Form 2 Slurried in Acetone, Water and Acetone/Water Mixtures.

| Entry | Water Content (vol %) | Temp (° C.) | Polymorphic Form by XRPD | |
|---|---|---|---|---|
| | | | 1 and 4 hr | 24 hr |
| 1 | 0 | 25 | 2 | 2 |
| 2 | 10 | | 2 | 2 |
| 3 | 20 | | 2 | 2 |
| 4 | 40 | | 2 | 2 |
| 5 | 100 | | 2 | 2 |
| 6 | 0 | 50 | 2 | 2 |
| 7 | 10 | | 2 | 1 |
| 8 | 20 | | 2 | 2 |
| 9 | 40 | | 2 | 1 |
| 10 | 100 | | 2 | 2 |

To investigate the generality of this unforeseen transformation a similar experiment was carried out in THF and in THF/water mixtures. Consistent with the data disclosed above it was found that incubation of Compound I as polymorphic Form 2 in THF alone, at both 25 and 50° C. for a period of at least 4 hr, had no effect on the polymorphic composition of the mixture. However the addition of water showed a pronounced effect on the conversion of the Form 2 polymorph into Form 1 which was observed to take place at both the lower and higher temperatures (Table 10). At 25° C. those mixtures comprising 10% and 20% water returned Form 1 after 4 and 24 hours respectively (Table 10, Entries 2 and 3). Strikingly, at 50° C. all of the aq THF mixtures resulted in the generation of the Form 1 crystalline state (Table 10, Entries 6-8).

TABLE 10

The Fate of Form 2 Slurried in THF and THF/Water Mixtures.

| Entry | Water Content (vol %) | Temp (° C.) | Polymorphic Form by XRPD | | |
|---|---|---|---|---|---|
| | | | 1 hr | 4 hr | 24 hr |
| 1 | 0 | 25 | 2 | 2 | nd |
| 2 | 10 | | 2 | 1 | 1 |
| 3 | 20 | | 2 | 2 | 1 |
| 4 | 40 | | 2 | 2 | 2 |
| 5 | 0 | 50 | 2 | 2 | nd |
| 6 | 10 | | 1 | 1 | 1 |
| 7 | 20 | | 1 | 1 | 1 |
| 8 | 40 | | 1 | 1 | 1 |

Footnote:

nd indicates not determined (data not collected)

It is evident that the presence of water induces the polymorphic transition reported above. However, other than at low levels, water is a potent anti-solvent in these systems and markedly depresses the solubility of the drug substance in the aqueous solvent mixture as its proportion rises. The consequence of this solubility profile is that in water alone or in solvent mixtures which are rich in water, the process of turnover from Form 2 to Form 1 either does not occur at all or is inhibited by marginal solubility, particularly at ambient temperature. In the case of acetone and especially in THF raising the temperature raises the solubility of the Form 2 input and accelerates its transformation into the Form 1 state.

A similar, revealing pattern of interconversion was derived from an experiment in which Form 2 was slurried in various mixtures of dioxane and water at ambient and elevated temperatures (Table 11). In the presence of 10% water the Form 1 polymorph is evident in the slurry mixture within an hour at 25° C. However, when the water content is elevated to 40% the transition is retarded to such an extent that only the sample taken at 24 hr was revealed to be present as Form 1. This ternary system behaved similarly at 50° C. However, at the higher temperature of 65° C. the rate of turnover is increased such that Form 1 was generated after 3 hr. Consistent with the data obtained from the experiments described above, increasing the proportion of water to 80% in this system was sufficient to halt the polymorphic interconversion at 25° C., 50° C. and even at 65° C.

TABLE 11

The Fate of Form 2 Slurried in 1,4-Dioxane/Water Mixtures.

| Entry | 1,4 Dioxane % water | Temp ° C. | Polymorphic Form by XRPD | | | |
|---|---|---|---|---|---|---|
| | | | 1 hr | 3 hr | 6 hr | 24 hr |
| 1 | 10 | 25 | 1† | 1† | 1† | 1† |
| 2 | 40 | | 2 | 2 | 2 | 1 |
| 3 | 80 | | 2 | 2 | 2 | 2 |
| 4 | 10 | 50 | — | — | — | 1 |
| 5 | 40 | | 2 | 2 | 2 | 1 |
| 6 | 80 | | 2 | 2 | 2 | 2 |
| 7 | 40 | 65 | 2 | 1 | 1 | 1 |
| 8 | 80 | | 2 | 2 | 2 | 2 |

†Trace of Form 2 remaining

The interplay of the nature of the organic solvent, the presence of adventitious water and slurry temperature (and by inference contact time) was revealed by maturation of the Form 2 solid in MEK in which the water content was ramped progressively from 1 to 8% by volume at both 25 and 50° C. (Table 12). It was observed that Form 2 integrity was maintained for at least 24 hours at the lower temperature until the water content exceeded 6%, despite an increase in solubility of Compound I from 19 to 30 mg/ml (data not shown). Once the proportion of water reached 8% the slurry mixture returned the Form 1 polymorph even though the solubility of the drug had diminished to 23 mg/mL.

Elevation of the temperature to 50° C. promoted the transformative process such that polymorphic interconversion was seen at the 24 hour time point for mixtures in which the water content exceeds 2%. It is evident from these data that the environmental conditions to which Compound I is exposed determines not only which of the two polymorphs, 1 or 2, is produced but also the rate at which interconversion takes place.

TABLE 12

The Fate of Form 2 Slurried in MEK/Water Mixtures.

| Water Content (% vol) | Temp ° C. | Polymorphic Form by XRPD |
|---|---|---|
| 1 | 25 | 2 |
| 2 | | 2 |
| 4 | | 2 |
| 6 | | 2 |
| 8 | | 1 |
| 1 | 50 | 2 |
| 2 | | 2 |
| 4 | | 1 |
| 6 | | 1 |
| 8 | | 1 |

The influence of the initial polymorphic composition on the fate of samples was investigated by equilibration of the either the single polymorphs or an equal mixture of both in anhydrous MEK and THF as well as in the same solvents doped with 5% water.

TABLE 13

Equilibration of Forms 1 and 2, Singularly and as Mixtures, in MEK and THF Alone and in the Presence of Water.

| Entry | Solvent | Input | Form by XRPD Post Equilibration[a] |
|---|---|---|---|
| 1 | MEK | 1 | 1 |
| 2 | | 2 | 2 |
| 3 | | 1 + 2 | 2 |
| 4 | THF | 1 | 1[b] |
| 5 | | 2 | 2 |
| 6 | | 1 + 2 | 2 |
| 7 | MEK/ | 1 | 1 |
| 8 | 5% Water | 2 | 2 |
| 9 | | 1 + 2 | 1 |
| 10 | THF/ | 1 | 1 |
| 11 | 5% Water | 2 | 1 |
| 12 | | 1 + 2 | 1 |

[a]Results at both equilibration temperatures the same unless indicated otherwise.
[b]Some evidence of Form 2 present at 10° C..

The results obtained (Table 13) reveal that in anhydrous media the two polymorphs retain their structural integrity, if present singularly (Table 13, Entries 1, 2, 4 and 5). Some minor evidence of turnover was seen in THF at 10° C. (Table 13, Entry 4) which may be attributable to the presence of traces of moisture in a highly hygroscopic solvent. However, mixtures of the two polymorphs transformed into Form 2 in either MEK or THF at both temperatures (Table 13, Entries 3 and 6), revealing this form is preferred under anhydrous, or near anhydrous, conditions.

The results observed when 5% water was admixed to the two solvents indicate that the predominance of the two forms reversed under these conditions, taking kinetic factors into account. In aqueous MEK (5% water) the single polymorphs were again unchanged for the duration of the experiment (Table 13, Entries 7 and 8). In contrast, the binary polymorphic mixture converted into Form 1 in this medium (Table 13, Entry 9). In aqueous THF (5% water) the dominance of Form 1 as the most preferred polymorph was especially evident. In this environment the suspension of Form 1 remained unchanged (Table 13, Entry 10), consistent with the outcome observed for aq MEK under the same conditions.

However, in THF doped with 5% water, both the suspension comprising the binary mixture, as well as that composed of the Form 2 polymorph alone, were transformed into suspensions containing only Form 1 (Table 13, Entries 11 and 12). These data are particularly surprising since the presence of water, as a minor component in these mixtures, overrides the stability hierarchy, seen to favour Form 2, when it is absent. This result is unexpected given that we disclose, elsewhere herein, evidence that the Form 2 polymorph is the more thermodynamically stable enantiotrope of Compound I in the temperature range (5-10° C.) of this experiment and below a temperature of at least 70° C.

Comparative Pharmacokinetic Profiling of Forms 1 and 2 by Inhalation Administration to Rats A study was undertaken to compare the time-course of unchanged drug concentrations in plasma following a single inhalation dose of either Form 1 or Form 2 in rats.

The male RccHan™:WIST rat was considered a suitable species and strain because of its acceptance by regulatory agencies. The inhalation route of administration was chosen to simulate the conditions of clinical administration. A total of 14 of animals (six animals per group with two spare animals), 10 to 12 weeks of age and weighing 306 to 341 g at the start of drug treatment, were used in the study. Treatment consisted of a single 2 hour inhalation exposure with a nebulised formulation of either micronised Form 1 (98.94% purity) to Group 1 animals or micronised Form 2 (98.10% purity) to Group 2 animals. The pharmacokinetic parameters of the two polymorphic forms were determined to support pharmacology and toxicology studies in animals and clinical studies in man.

Suspensions were manufactured by first preparing a concentrated solution of the surfactants (wetting solution) and a saline solution. These were then used to make the vehicle. A saline solution was prepared as follows. Sodium chloride (50 g) was weighed into a 5000 mL volumetric flask, made up to volume with water, stirred with a magnetic stirrer for 10 min and then passed through a 0.22 μm membrane filter. Wetting solution was prepared as follows. Lipoid S100 (10 g) was weighed into a 2000 mL Duran bottle, 1000 g of propylene glycol was added and the mixture was stirred on a Silverson mixer equipped with a 1" high shear screen for 1 min at 8000 rpm and then passed through a 0.22 μm membrane filter. Vehicle was prepared as follows. The wetting solution (500 mL) was transferred into a 5000 mL volumetric flask, made to volume with saline solution, stirred with a magnetic stirrer for 10 min and then passed through a 0.22 μm membrane filter.

A 1000 mL batch of 4 mg/mL suspension of Compound I was prepared as follows. Compound I (4.00 g) was weighed into a small beaker, 100 mL of wetting solution was added and the mixture was stirred with a Silverson mixer equipped with a 1" high shear screen for 5 min at 8000 rpm. The mixture was then transferred into a 5000 mL Duran bottle using saline solution and stirred using a Silverson mixer equipped with a 1" high shear screen for 5 min at 8000 rpm, after which it was stored between 2 and 8° C. Higher or lower strength suspensions (range 0.2 to 20 mg/mL) were prepared by adjusting the input weight of API as appropriate for higher mg/mL suspensions or by further diluting with vehicle for lower mg/mL suspensions. All formulations were magnetically stirred for at least 30 min, and assessed visually prior to administration.

Rats were acclimatised to the inhalation dosing procedure for three consecutive days prior to dosing. Animals were treated with the test substance by aerosol inhalation administration for 120 min via snout only exposure, at a target aerosol concentration of 25.2 μg/L. The estimations of inhaled dose from an exposure duration of 2 hr and an assumed body weight of 300 g were calculated using the formula:

$$\text{Dose (mg/kg/day)} = \frac{C \times RMV \times D}{BW \times 10}$$

where: C is the aerosol concentration (μg/L); RMV is the respiratory minute volume (L/min); D is the duration of exposure (120 mins) and BW is the group mean body weight (kg). The mean achieved aerosol concentrations, estimated inhaled dose and particle size distribution (PSD) summary data are presented below. (Table 14).

TABLE 14

Chamber Aerosol Concentrations and Estimated Inhaled Dosages of Compound I Attained During Aerosol Inhalation Administration.

| Group No | Average Aerosol Conc (µg/L) | Estimated Inhaled Dose (mg/kg) | MMAD (µm) | σg |
|---|---|---|---|---|
| 1 | 28.8 | 2.48 | 2.3 | 1.60 |
| 2 | 32.6 | 2.82 | 2.2 | 1.70 |

Footnotes:
MMAD. Mass median aerodynamic diameter;
σg. Geometric standard deviation As shown in Table 14, target aerosol concentrations of 25.2 µg/L were selected to deliver nominal doses of 2.2 mg/kg. An actual aerosol concentration of 28.8 µg/L of Form 1 was achieved providing an estimated inhaled dosage of approximately 2.48 mg/kg to Group 1 animals. The aerosol concentration attained for Form 2 was 32.6 µg/L thereby delivering an estimated inhaled dosage of approximately 2.82 mg/kg for Group 2 animals.

The achieved aerosol concentrations were close to the target value and the estimated inhaled doses were 113% and 128% of target for Groups 1 and 2 respectively. The particle size distribution confirmed that the generated aerosols were respirable to the rat.

Venous blood samples (0.3 mL) were taken from the tail vein of animals and samples collected after dosing (2 hr from the start of dose administration) and thereafter at times 3, 4, 6, 8, 12, 24, 28, 32, 36 and 48 hr following treatment. Samples were treated with K$_2$EDTA anticoagulant, spun at 2000 g for 10 min at 4° C. and then stored frozen (−20° C.±10) whilst awaiting analysis. Plasma samples were subsequently analysed for Compound I by LGC using a validated LC-MS/MS method.

Extraction and Analysis Procedures

Rat plasma samples were vortex mixed and a 25 µL aliquot removed and treated with 12.5 µL of internal standard working solution (comprising 20 ng/mL of Compound 2) and 25 µL of 10 mM aq ammonium formate solution. The mixture was vortexed for 5 min at 1400 rpm, after which 300 µL of MTBE was added and the sample was then tumble mixed for 10 min. Following centrifugation at 3500 g for 5 min an aliquot of 150 µL of the organic layer was removed and evaporated to dryness under nitrogen at 50° C. for approximately 15 min. The residue was reconstituted in 100 µL of a mixture of acetonitrile and water (50:50) containing 0.1% formic acid and vortex mixed for 5 min at 1400 rpm. Samples prepared in this manner were then analysed using a validated LC-MS/MS to determine the original plasma concentration of Compound I.

The LC system comprised an Acquity Binary Solvent Manager fitted with an Acquity UPLC C8 (50×2.1 mm) analytical column, the latter maintained at a nominal temperature of 40° C. Samples were analysed over a run time of 2.3 min by gradient elution (Table 15) using 0.1% formic acid in acetonitrile (mobile phase A) and 0.1% formic acid in water (mobile phase B) at a flow rate of 0.8 mL/min.

TABLE 15

HPLC Eluent Gradient Profile.

| Time (min) | % A | % B |
|---|---|---|
| 0 | 30 | 70 |
| 0.2 | 30 | 70 |
| 1.4 | 95 | 5 |
| 1.9 | 95 | 5 |
| 2.0 | 30 | 70 |
| 2.3 | 30 | 70 |

Compound I was used as a reference standard and the tetra deutero derivative Compound 2 was employed as the internal standard. Compound 2 is: 4-(4-(4-(((3R,5R)-5-((1H-1,2,4-triazol-1-yl)methyl)-5-(2,4-difluorophenyl) tetrahydrofuran-3-yl)methoxy)-3-methylphenyl)piperazin-1-yl)-N-(4-fluorophenyl-2,3,5,6-d$_4$)benzamide.

Compound 2

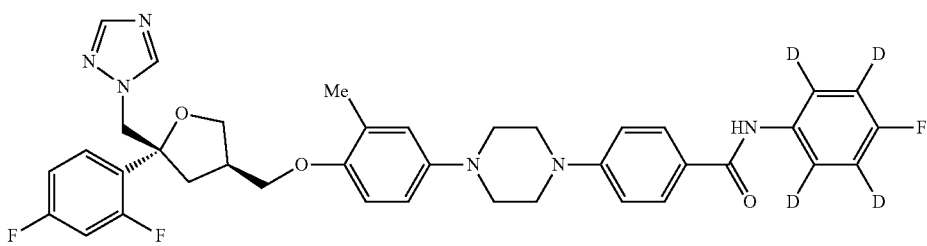

All instrument control, data collection, peak area integration and storage was performed using MassLynx (version 4.1). The mass spectrometer response (peak area ratio of analyte to internal standard) of each calibration standard was calculated by Watson LIMS (version 7.2) and plotted against the nominal (prepared) concentration. A weighted (1/x$^2$) least squares linear regression analysis was used to calculate an equation of the calibration curve. Concentrations of Compound I in the samples were back-calculated from the calibration curves to 3 significant figures. Microsoft Excel 2010 was used for further calculations. All percentages are presented to one decimal place.

Pharmacokinetic analysis was performed on Phoenix WnNonlin. Maximum mean plasma concentrations (C$_{max}$) and their times of occurrence (T$_{max}$) were determined. Areas under the mean plasma concentration-time curves up to the time of the last quantifiable sample (AUC$_t$) were estimated by the linear trapezoidal rule. There were no adverse effects of the drug substance following its administration and serial blood samples were taken up to 48 hours after the start of the inhalation exposure.

The mean pharmacokinetic parameters for the two polymorphs following their inhalation administration to rats are summarised in Table 16 and described in more detail below.

TABLE 16

Mean Pharmacokinetic Parameters for Forms 1 and 2 of Compound I Following their Inhalation Administration to Rats.

| Pharmacokinetic Parameters | Mean | |
|---|---|---|
| | Form 1 | Form 2 |
| Nominal dose (mg/kg) | 2.2 | 2.2 |
| Estimated inhaled dose (mg/kg) | 2.48 | 2.82 |
| $C_{max}$ (ng/mL) | 4.95 | 8.59 |
| $T_{max}$ (hr) | 6 | 6 |
| $AUC_t$ (ng · h/mL)[a] | 122 | 230 |
| $AUC_t$ dose normalised (ng · h/mL)[b] | 122 | 202 |
| Relative bioavailability | Reference (100%) | 166% |

Footnotes:
[a] Both $AUC_t$ values are 0-48 hr;
[b] $AUC_t$ of Form 2 normalised to dose achieved for Form 1 (2.48 mg/kg)

Plasma Concentrations

Figure 19:
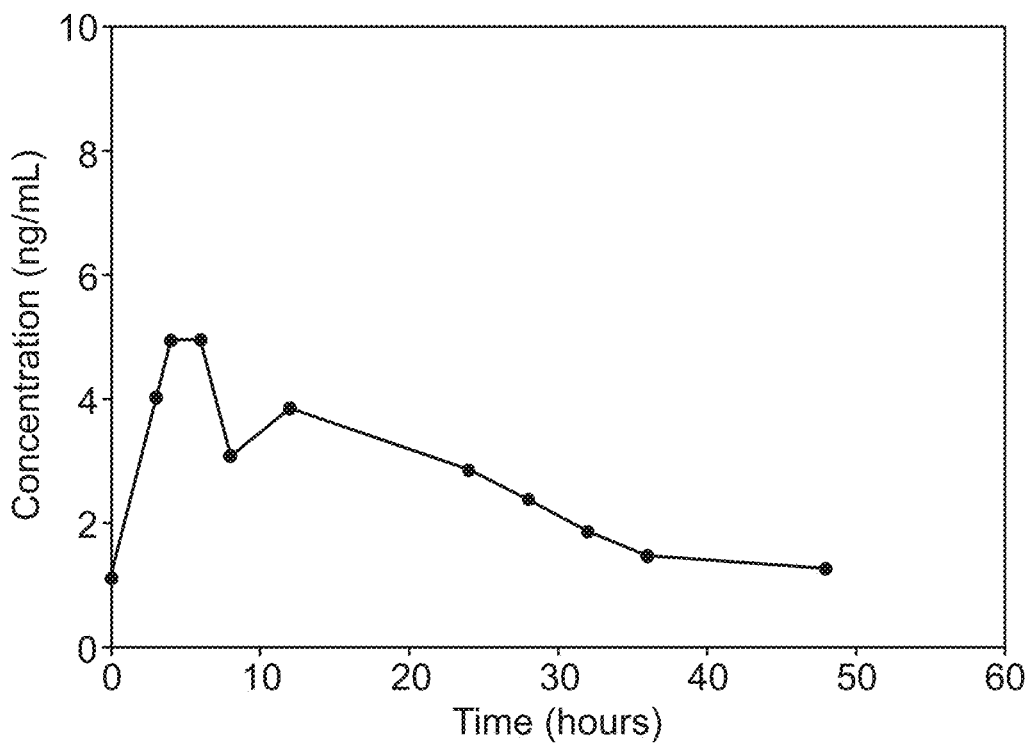
FIG. 19: Mean plasma drug concentrations following inhalation administration of polymorphic Form 1 to male rats at a nominal dose of 2.2 mg/kg.
Figure 20:
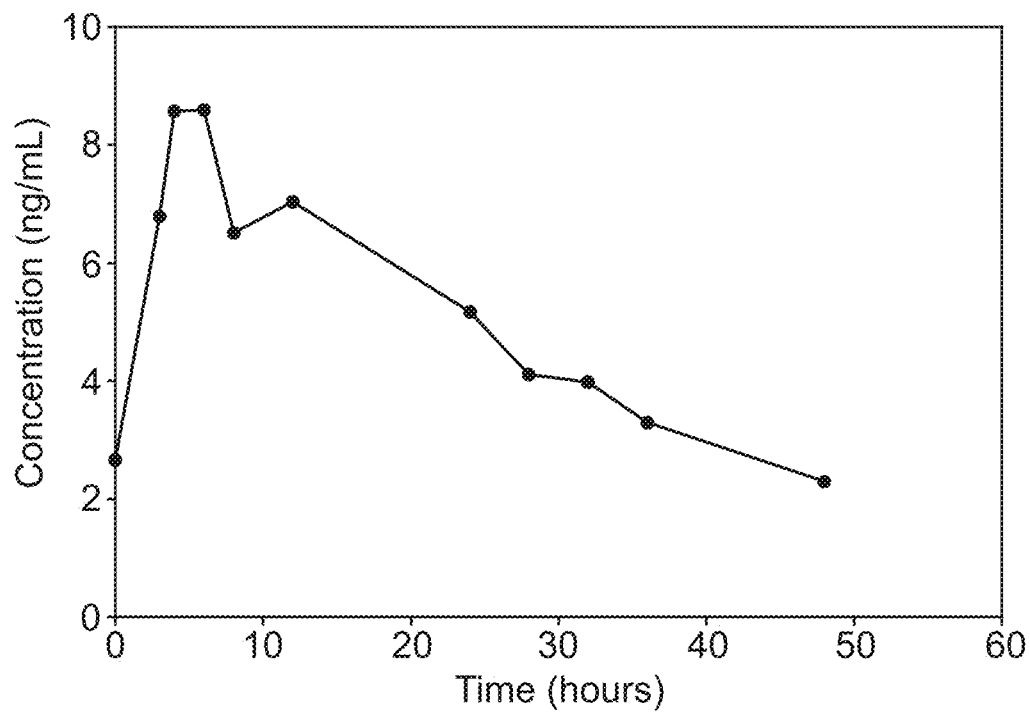
FIG. 20: Mean plasma drug concentrations following inhalation administration of polymorphic Form 2 to male rats at a nominal dose level of 2.2 mg/kg.

The plasma concentrations of drug following inhalation administration of Forms 1 and 2 remained quantifiable up to 48 hr after the start of exposure for both groups and are presented below (Tables 17 and 18 respectively). The mean plasma concentration-time profiles derived therefrom are represented graphically (FIGS. 19 and 20 for Forms 1 and 2 respectively).

TABLE 17

Plasma Concentrations of Drug Following Inhalation Administration of Form 1 to Male Rats at a Nominal Dose Level of 2.2 mg/kg.

| Time | Drug Concentration (ng/mL) in Animal by No. | | | | | | | |
|---|---|---|---|---|---|---|---|---|
| hr[a] | 1 | 2 | 3 | 4 | 5 | 6 | Mean | sd |
| IAD | 1.16 | 0.826 | 1.35 | — | — | — | 1.11 | 0.27 |
| 3 | — | — | — | 5.31 | 4.35 | 2.41 | 4.02 | 1.48 |
| 4 | 4.73 | 6.32 | 3.78 | — | — | — | 4.94 | 1.28 |
| 6 | — | — | — | 5.38 | 3.97 | 5.49 | 4.95 | 0.85 |
| 8 | 3.28 | NS | 2.88 | — | — | — | 3.08 | — |
| 12 | — | — | — | 4.05 | NS | 3.64 | 3.85 | — |
| 24 | 2.47 | 3.00 | 3.85 | 2.75 | 2.02 | 3.03 | 2.85 | 0.62 |
| 28 | 1.85 | 2.22 | 3.92 | 1.87 | NS | 2.04 | 2.38 | 0.87 |
| 32 | 1.36 | 1.85 | 2.79 | 1.66 | 2.20 | 1.32 | 1.86 | 0.56 |
| 36 | 1.21 | 1.36 | 1.74 | 1.70 | 1.01 | 1.80 | 1.47 | 0.32 |
| 48 | 1.10 | 1.45 | 1.28 | 1.26 | NS | 1.19 | 1.26 | 0.13 |

Footnotes: [a] from start of inhalation exposure; IAD: immediately after dosing; NS: no sample.

Table 18: Plasma Concentrations of Drug Following Inhalation Administration of Form 2 to Male Rats at a Nominal Dose Level of 2.2 mg/kg.

| Time | Drug Concentration (ng/mL) in Animals by No. | | | | | | | |
|---|---|---|---|---|---|---|---|---|
| hr[a] | 1 | 2 | 3 | 4 | 5 | 6 | Mean | sd |
| IAD | 2.24 | 2.59 | 3.15 | — | — | — | 2.66 | 0.46 |
| 3 | — | — | — | 8.95 | 5.40 | 6.01 | 6.79 | 1.90 |
| 4 | 7.53 | 9.31 | 8.88 | — | — | — | 8.57 | 0.93 |
| 6 | — | — | — | 11.8 | 5.38 | NS | 8.59 | — |
| 8 | 6.85 | 5.90 | 6.79 | — | — | — | 6.51 | 0.53 |
| 12 | — | — | — | 10.7 | 4.57 | 5.84 | 7.04 | 3.24 |
| 24 | 11.5 | 3.24 | 4.22 | 5.26 | 3.58 | 3.24 | 5.17 | 3.19 |
| 28 | 8.15 | 3.17 | 3.32 | 4.15 | 2.94 | 2.93 | 4.11 | 2.03 |
| 32 | 7.72 | 3.50 | 3.33 | 4.05 | 2.75 | 2.51 | 3.98 | 1.91 |
| 36 | 6.28 | 2.43 | 2.54 | 3.59 | 2.49 | 2.43 | 3.29 | 1.53 |
| 48 | 3.78 | 1.79 | 1.89 | 2.52 | 1.83 | 1.91 | 2.29 | 0.78 |

Footnotes: [a] from start of inhalation exposure; IAD: immediately after dosing; NS: no sample.

The mean plasma concentrations of Form 1 (Group 1) increased to a maximum at 6 hr after the start of exposure and thereafter declined steadily to the last sampling time of 48 hr after the start of exposure. The mean $C_{max}$ was 4.95 ng/mL and the mean $AUC_t$ value was 122 ng·h/mL for Form 1. The mean plasma concentrations of Form 2 increased to a maximum 6 hr after the start of exposure and thereafter declined steadily to 48 hr after the start of exposure. The mean $C_{max}$ was 8.59 ng/mL and the mean $AUC_t$ value was 230 ng·h/mL for Form 2. Both polymorphs had similar $T_{max}$ values but the individual mean plasma concentrations were of greater magnitude at all 11 sampling times in the group of rats dosed with Form 2, compared with the data for Form 1. Consequently, dose normalised $C_{max}$ and $AUC_t$ values were 1.5 and 1.7 fold higher respectively for Form 2.

Relative Bioavailability

The relative bioavailability (RF) of the two polymorphs following inhalation administration was calculated using the formula:

$$RF = AUC_t(\text{Form 2})/AUC_t(\text{Form 1}) \times \text{achieved dose (Form 1)/achieved dose (Form 2)}$$

The dose normalised $AUC_t$ values for the Form 2 polymorph (Table 16) indicate a relative bioavailability of 166% relative to Form 1 following inhaled administration to rats.

This study reveals that both crystalline forms were systemically available via the inhalation route and that exposure persisted for a period up to 48 hr after the start of administration. However, it is notable that Form 2 (FIG. 20) gave consistently higher systemic concentrations of drug over the 48 hr PK profile than did Form 1 (FIG. 19). The dose normalised $C_{max}$ and $AUC_t$ values for the Form 2 polymorph are approximately 1.5 and 1.7 fold higher, respectively, than for Form 1.

In view of its superior bioavailability the Form 2 polymorph may be expected to have utility in the treatment of mycoses wherein fast dissolution and amplification of the drug concentration at the site of therapeutic action is required. In an aqueous suspension it appears that Form 2 is prevented from transitioning to Form 1, although Form 2 is thought to be metastable in this environment, as discussed above. Hence the Form 2 polymorph is especially suitable for administration by inhalation as an aqueous suspension.

Form 1 may also be expected to have utility in the treatment of mycoses as exemplified by the systemic bioavailability of this polymorphic form. In addition, the Form 1 polymorph may be expected to have utility in formulations other than aqueous suspensions such as creams and pessaries. Such administration may have utility in the prevention of mycoses in individuals who are at risk of being infected with mycoses, such as those affecting the skin and other sites which may be dosed topically.

Summary of Data

The application discloses two new polymorphic forms of Compound I: Form 1 and Form 2. Both forms have good thermal stability as evidenced by their high melting points (see Table 7). Additionally both polymorphs have acceptable bioavailability when administered as an aqueous suspension by inhalation, although that of Form 2 is notably higher than that of Form 1 (see relative bioavailability data presented hereinabove). Both crystalline forms are amenable to micronisation to give particle size distributions compatible with inhalation administration (see FIGS. 10 and 13). The Form 1 polymorph is expected to be particularly suited for use in formulations other than aqueous suspensions. The Form 2 polymorph is particularly suited for use in aqueous suspension formulations such as those intended for administration by inhalation.

Throughout the specification and the claims which follow, unless the context requires otherwise, the word 'comprise', and variations such as 'comprises' and 'comprising', will be understood to imply the inclusion of a stated integer, step, group of integers or group of steps but not to the exclusion of any other integer, step, group of integers or group of steps.

All patents, patent applications and references mentioned throughout the specification of the present invention are herein incorporated in their entirety by reference.

The invention embraces all combinations of preferred and more preferred groups and suitable and more suitable groups and embodiments of groups recited above.

REFERENCES

Burger A. and Ramburger R. On the polymorphism of pharmaceuticals and other molecular crystals. I Theory of Thermodynamic Rules. *Mikrochim. Acta,* 1979, 72, 259-271.

Sunose M., Colley T. C., Ito K., Rapeport G. and Strong P. WO 2016/087878, 9 Jun. 2016; PCT/GB2015/053731 A1, 4 Dec. 2015.

Colley T. C., Ito K., Rapeport G., Strong P., Murray P. J., Onions S. T. and Sunose M., WO 2016/087880 A1, 9 Jun. 2016; PCT/GB2015/053733, 4 Dec. 2015.

Colley T., Sehra G., Daly L., Kimura G., Nakaoki T., Nishimoto Y., Kizawa Y., Strong P., Rapeport G. and Ito K. Antifungal synergy of a topical triazole, PC945, with a systemic triazole against respiratory *Aspergillus fumigatus* infection. *Nature Scientific Reports,* 2019, 9:9482.

Colley T., Alanio A., Kelly, S. L., Sehra G., Kizawa Y., Warrilow A. G. S., Parker J. E., Kelly D. E., Kimura G., Anderson-Dring L., Nakaoki T., Sunose M., Onions S., Crepin D., Lagasse F., Critall M., Shannon J., Cooke M., Bretagne S., King-Underwood J., Murray J., Ito K., Strong P., Rapeport G. In Vitro and In Vivo Antifungal Profile of a Novel and Long-Acting Inhaled Azole on *Aspergillus fumigatus* Infection. *Antimicrob. Agents Chemother.,* 2017, 61:e02280-16.

Shivaprakash M., Rudramurthy S. M., Colley T., Abdolrasouli A., Ashman J., Dhaliwal M., Kaur H., Armstrong-James D., Strong P., Rapeport G., Schelenz S., Ito K. and Chakrabarti A. In vitro antifungal activity of a novel topical triazole PC945 against emerging yeast *Candida auris. J. Antimicrob. Chemother.,* 2019, 74(10); 2943-2949.

Kimura G., Nakaoki T., Colley T., Rapeport G., Strong P., Ito K., Kizawa Y. In vivo Biomarker Analysis of the Effects of Intranasally Dosed PC945, a Novel Antifungal Triazole, on *Aspergillus fumigatus* Infection in immunocompromised mice. *Antimicrob. Agents Chemother.,* 2017, 61:e00124-17.

The invention claimed is:

1. A compound of formula (I):

Compound I

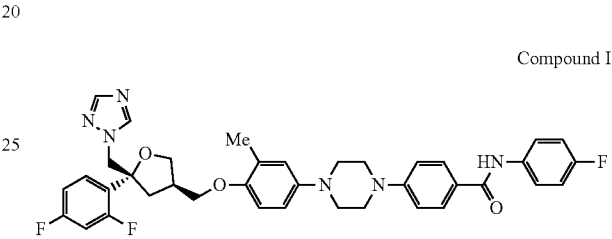

that is 4-(4-(4-(((3R,5R)-5-((1H-1,2,4-triazol-1-yl)methyl)-5-(2,4-difluorophenyl)tetrahydrofuran-3-yl)methoxy)-3-methylphenyl) piperazin-1-yl)-N-(4-fluorophenyl)benzamide in a crystalline form wherein the crystalline form is polymorphic Form 1 characterized by an X-ray powder diffraction pattern comprising characteristic peaks expressed in degrees 2-theta at ±0.2 of 7.0, 7.4, 7.9, 18.2, 19.7, 20.8, 24.7 degrees as measured using Cu Kα radiation or polymorphic Form 2 characterized by an X-ray powder diffraction pattern comprising characteristic peaks expressed in degrees 2-theta at ±0.2 of 10.8, 17.0, 20.3, 22.7, 23.9 and 24.3 degrees as measured using Cu Kα radiation.

2. A compound of formula (I):

Compound I

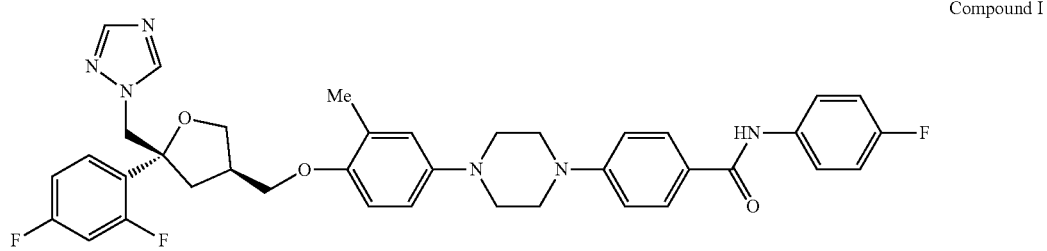 [SMILES: Cc1cc(N2CCN(c3ccc(C(=O)Nc4ccc(F)cc4)cc3)CC2)ccc1OC[C@@H]1CO[C@@](Cn2cncn2)(c2ccc(F)cc2F)C1]

that is 4-(4-(4-(((3R,5R)-5-((1H-1,2,4-triazol-1-yl)methyl)-5-(2,4-difluorophenyl)tetrahydrofuran-3-yl)methoxy)-3-methylphenyl) piperazin-1-yl)-N-(4-fluorophenyl)benzamide in a crystalline form according to claim 1 wherein the crystalline form is polymorphic Form 1 characterized by an X-ray powder diffraction pattern comprising characteristic peaks expressed in degrees 2-theta at ±0.2 of 7.0, 7.4, 7.9, 18.2, 19.7, 20.8, 24.7 degrees as measured using Cu Kα radiation.

3. The compound according to claim 2 wherein the crystalline form has unit cell dimensions of 16.80 Å, 23.58 Å and 25.58 Å, and α, β and γ angles of 90°.

4. A compound of formula (I):

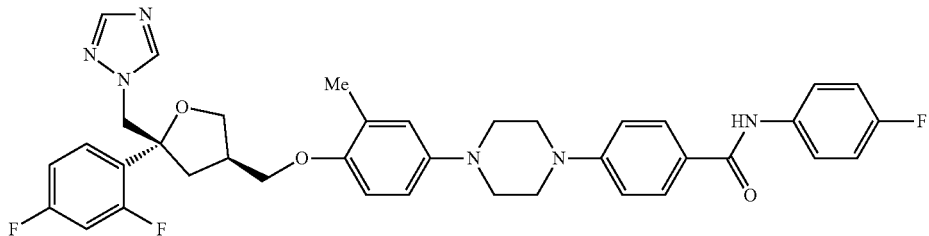

Compound I that is 4-(4-(4-(((3R,5R)-5-((1H-1,2,4-triazol-1-yl)methyl)-5-(2,4-difluorophenyl)tetrahydrofuran-3-yl)methoxy)-3-methylphenyl) piperazin-1-yl)-N-(4-fluorophenyl)benzamide in a crystalline form according to claim 1 wherein the crystalline form is polymorphic Form 2 characterized by an X-ray powder diffraction pattern comprising characteristic peaks expressed in degrees 2-theta at ±0.2 of 10.8, 17.0, 20.3, 22.7, 23.9 and 24.3 degrees as measured using Cu Kα radiation.

5. The compound according to claim 4 wherein the crystalline form has unit cell dimensions of 16.81 Å, 5.65 Å and 35.56 Å, and an α angle of 90°, a β angle of 101.54° and a γ angle of 90°.

* * * * *